(12) United States Patent
Ashworth et al.

(10) Patent No.: US 11,418,253 B2
(45) Date of Patent: Aug. 16, 2022

(54) TIME DIVISION DUPLEX (TDD) REPEATER CONFIGURED TO COMMUNICATE WITH A SPECTRUM ACCESS SYSTEM (SAS)

(71) Applicant: WILSON ELECTRONICS, LLC, St. George, UT (US)

(72) Inventors: Christopher Ken Ashworth, Toquerville, UT (US); Dale Robert Anderson, Colleyville, TX (US)

(73) Assignee: Wilson Electronics, LLC, St. George, UT (US)

( * ) Notice: Subject to any disclaimer, the term of this patent is extended or adjusted under 35 U.S.C. 154(b) by 0 days.

(21) Appl. No.: 16/727,875

(22) Filed: Dec. 26, 2019

(65) Prior Publication Data
US 2020/0212994 A1 Jul. 2, 2020

Related U.S. Application Data

(60) Provisional application No. 62/786,864, filed on Dec. 31, 2018.

(51) Int. Cl.
| | |
|---|---|
| *H04B 7/155* | (2006.01) |
| *H04W 72/04* | (2009.01) |
| *H04L 5/14* | (2006.01) |
| *H04L 27/26* | (2006.01) |
| *H04W 74/08* | (2009.01) |

(52) U.S. Cl.
CPC ..... *H04B 7/15592* (2013.01); *H04B 7/15535* (2013.01); *H04L 5/1469* (2013.01); *H04L 27/2623* (2013.01); *H04W 72/0453* (2013.01); *H04W 74/0808* (2013.01)

(58) Field of Classification Search
None
See application file for complete search history.

(56) References Cited

U.S. PATENT DOCUMENTS

| | | | |
|---|---|---|---|
| 4,776,032 A | 10/1988 | Odate et al. | |
| 5,303,395 A | 4/1994 | Dayani | |
| 5,737,687 A | 4/1998 | Martin et al. | |
| 5,777,530 A | 7/1998 | Nakatuka | |
| 5,835,848 A | 11/1998 | Bi et al. | |
| 6,005,884 A | 12/1999 | Cook et al. | |
| 6,711,388 B1 | 3/2004 | Neitiniemi | |
| 6,889,033 B2 | 5/2005 | Bongfeldt | |

(Continued)

FOREIGN PATENT DOCUMENTS

EP 1525678 B1 7/2008

OTHER PUBLICATIONS

ECFR (Electronic Code of Federal Regulations, as amended at 83 FR 63096, Dec. 7, 2018) (Year: 2018).*

(Continued)

*Primary Examiner* — Kenny S Lin
(74) *Attorney, Agent, or Firm* — Thorpe North & Western LLP

(57) ABSTRACT

A technology is described for a repeater. The repeater can be configured to: receive an access level indicator from a spectrum access system (SAS) for a selected contested frequency band; identify one or more sub-bands available to the repeater in the selected contested frequency band based on the access level indicator; and activate the repeater for the one or more sub-bands when the access level permits repeater access.

28 Claims, 23 Drawing Sheets

(56) References Cited

U.S. PATENT DOCUMENTS

| | | | |
|---|---|---|---|
| 6,990,313 B1 | 1/2006 | Yarkosky | |
| 7,035,587 B1 | 4/2006 | Yarkosky | |
| 7,221,967 B2 | 5/2007 | Van Buren et al. | |
| 7,974,573 B2 | 7/2011 | Dean | |
| 10,575,321 B1* | 2/2020 | Wiatrowski | H04W 16/10 |
| 2002/0044594 A1 | 4/2002 | Bongfeldt | |
| 2003/0123401 A1 | 7/2003 | Dean | |
| 2004/0137854 A1 | 7/2004 | Ge | |
| 2004/0146013 A1 | 7/2004 | Song et al. | |
| 2004/0166802 A1 | 8/2004 | McKay, Sr. et al. | |
| 2004/0219876 A1 | 11/2004 | Baker et al. | |
| 2004/0235417 A1 | 11/2004 | Dean | |
| 2005/0118949 A1 | 6/2005 | Allen et al. | |
| 2006/0084379 A1 | 4/2006 | O'Neill | |
| 2007/0071128 A1 | 3/2007 | Meir et al. | |
| 2007/0188235 A1 | 8/2007 | Dean | |
| 2008/0081555 A1 | 4/2008 | Kong et al. | |
| 2008/0096483 A1 | 4/2008 | Van Buren et al. | |
| 2008/0278237 A1 | 11/2008 | Blin | |
| 2011/0151775 A1 | 6/2011 | Kang et al. | |
| 2012/0099490 A1* | 4/2012 | Kummetz | H04W 72/0473 370/280 |
| 2015/0146805 A1* | 5/2015 | Terry | H04L 45/24 375/260 |
| 2016/0212624 A1 | 7/2016 | Mueck et al. | |
| 2017/0126202 A1* | 5/2017 | Shapoury | H01P 5/12 |
| 2017/0251474 A1* | 8/2017 | Khlat | H04B 1/18 |
| 2018/0042018 A1 | 2/2018 | Bhushan et al. | |
| 2018/0132111 A1* | 5/2018 | Mueck | H04B 1/715 |
| 2018/0132241 A1* | 5/2018 | Gayde | H04B 17/318 |
| 2018/0248676 A1 | 8/2018 | Raggio et al. | |
| 2018/0288621 A1 | 10/2018 | Markwart et al. | |
| 2019/0069201 A1* | 2/2019 | Hassan | H04W 16/14 |
| 2019/0141713 A1* | 5/2019 | Cimpu | H04W 16/14 |
| 2019/0166506 A1* | 5/2019 | Ashrafi | H04W 12/06 |
| 2020/0412590 A1* | 12/2020 | Akkarakaran | H04L 27/26136 |

OTHER PUBLICATIONS

3GPP2 C.S0011-B; "Recommended Minimum Performance Standards for cdma2000® Spread Spectrum Mobile Stations"; TIA-98-E; (Dec. 13, 2002); 448 pages; Release B, V1.0, Revision E.

ADL5513; "1 MHz to 4 GHz, 80 dB Logarithmic Detector/Controller"; Data Sheet; (2008); 12 pages; Analog Devices, Inc.

HMC713LP3E; "54 dB, Logarithmic Detector / Controller, 50—8000 MHz"; Data Sheet; (2010); 12 pages.

HMC909LP4E; "Rms Power Detector Single-Ended, DC—5.8 GHz"; Data Sheet; (2010); 21 pages.

PIC16F873; "28/40-Pin 8-Bit CMOS Flash Microcontrollers"; (2001); Data Sheet; 218 pages.

* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 3a

| Format | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |

Symbol number in a slot

| Format | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | F | F | F | F | U |
| 32 | D | D | D | D | D | D | D | D | F | F | F | F | F | U |
| 33 | D | D | D | D | D | D | D | F | F | F | F | F | F | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | F | U | U | D | D | F | F | F | U | U |
| 51 | D | F | F | F | U | U | U | D | F | F | F | U | U | U |
| 52 | D | F | F | U | U | U | U | D | F | F | U | U | U | U |
| 53 | D | D | F | F | U | U | U | D | D | F | F | U | U | U |
| 54 | F | F | F | F | F | F | F | D | D | D | D | D | D | D |
| 55 | D | D | F | U | U | U | U | U | D | D | D | D | D | D |

TIME DIVISION DUPLEX (TDD) REPEATER CONFIGURED TO COMMUNICATE WITH A SPECTRUM ACCESS SYSTEM (SAS)

RELATED APPLICATIONS

The present application claims the benefit of U.S. Provisional Patent Application No. 62/786,864 filed Dec. 31, 2018 the entire specification of which is hereby incorporated by reference in its entirety for all purposes.

BACKGROUND

Repeaters can be used to increase the quality of wireless communication between a wireless device and a wireless communication access point, such as a cell tower. Repeaters can improve the quality of the wireless communication by amplifying, filtering, and/or applying other processing techniques to uplink and downlink signals communicated between the wireless device and the wireless communication access point.

As an example, the repeater can receive, via an antenna, downlink signals from the wireless communication access point. The repeater can amplify the downlink signal and then provide an amplified downlink signal to the wireless device. In other words, the repeater can act as a relay between the wireless device and the wireless communication access point. As a result, the wireless device can receive a stronger signal from the wireless communication access point. Similarly, uplink signals from the wireless device (e.g., telephone calls and other data) can be received at the repeater. The repeater can amplify the uplink signals before communicating, via an antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 3a illustrates time division duplex (TDD) Long Term Evolution (LTE) uplink-downlink configurations in accordance with an example;

FIG. 3b illustrates time division duplex (TDD) 5G uplink-downlink configurations in accordance with an example;

FIG. 3c illustrates time division duplex (TDD) 5G uplink-downlink configurations in accordance with an example;

Figure 1A:
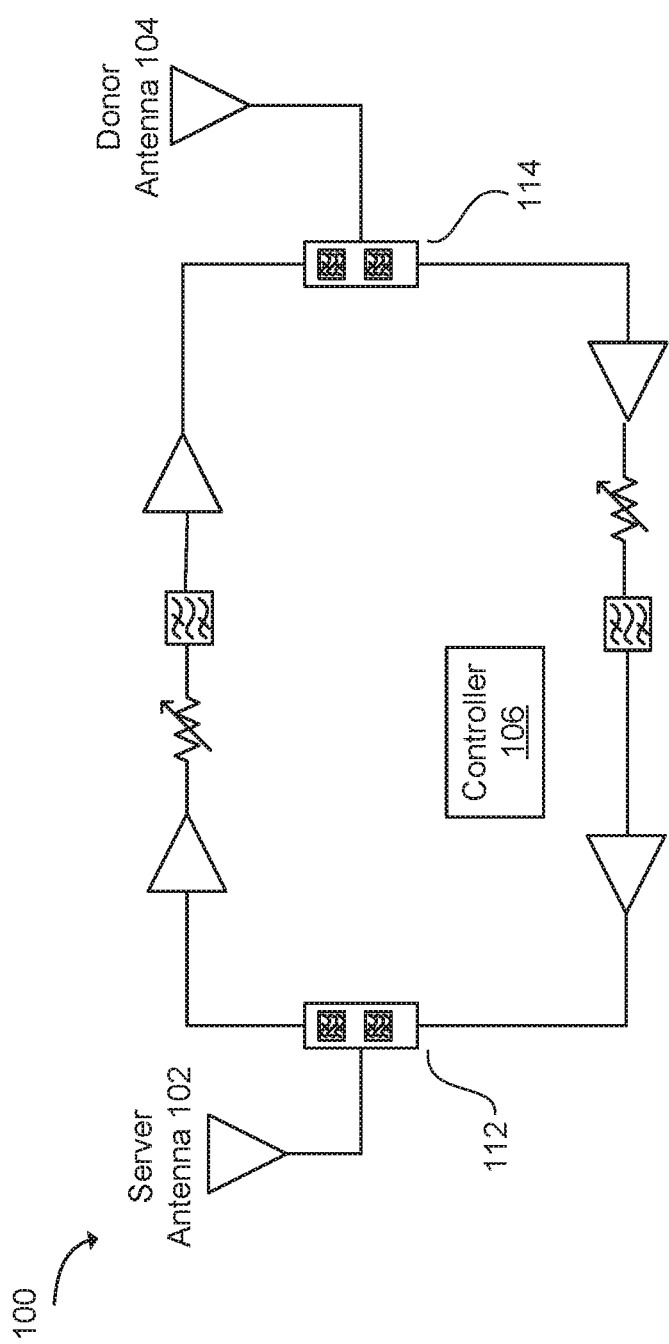
FIG. 1a illustrates a repeater in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In an example, as illustrated in FIG. 1a, a bi-directional repeater system can comprise a repeater 100 connected to an outside antenna 104 or donor antenna 104 and an inside antenna 102 or server antenna 102. The repeater 100 can include a donor antenna port that can be internally coupled to a second duplexer (or diplexer or multiplexer or circulator or splitter) 114. The repeater 100 can include a server antenna port that can also be coupled to a first duplexer (or diplexer or multiplexer or circulator or splitter) 112. Between the two duplexers, 114 and 112, can be two paths: a first path and a second path. The first path can comprise a low noise amplifier (LNA) with an input coupled to the first duplexer 112, a variable attenuator coupled to an output of the LNA, a filter coupled to the variable attenuator, and a power amplifier (PA) coupled between the filter and the second duplexer 114. The LNA can amplify a lower power signal without degrading the signal to noise ratio. The PA can adjust and amplify the power level by a desired amount. A second path can comprise an LNA with an input coupled to the second duplexer 114, a variable attenuator coupled to an output of the LNA, a filter coupled to the variable attenuator, and a PA coupled between the filter and the first duplexer 112. The first path can be a downlink amplification path or an uplink amplification path. The second path can be a downlink amplification path or an uplink amplification path. The repeater 100 can also comprise a controller 106. In one example, the controller 106 can include one or more processors and memory.

Figure 1B:
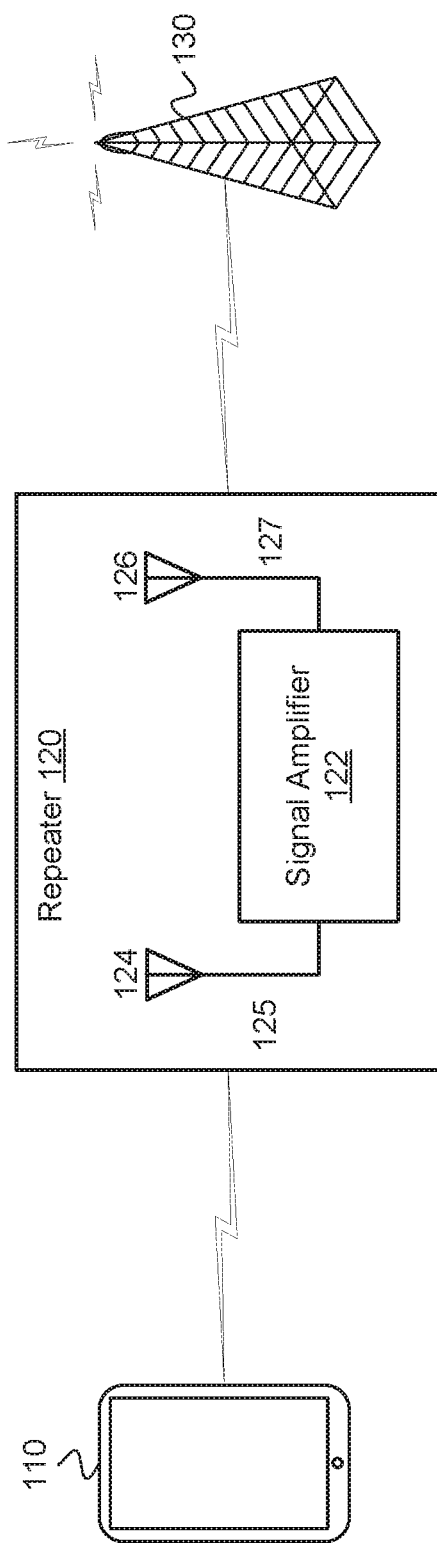
FIG. 1b illustrates a repeater in communication with a user equipment (UE) and a base station (BS) in accordance with an example.

FIG. 1b illustrates an exemplary repeater 120 in communication with a wireless device 110 and a base station 130. The repeater 120 (also referred to as a cellular signal amplifier) can improve the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the repeater 120 can amplify or boost uplink signals and/or downlink signals bi-directionally. In one example, the repeater 120 can be at a fixed location, such as in a home or office. Alternatively, the repeater 120 can be attached to a mobile object, such as a vehicle or a wireless device 110. The repeater can be a signal booster, such as a cellular signal booster.

In one configuration, the repeater 120 can be configured to be connected to a device antenna 124 (e.g., an inside antenna, server antenna, or a coupling antenna) and a node antenna 126 (e.g., an outside antenna or donor antenna). The node antenna 126 can receive the downlink signal from the base station 130. The downlink signal can be provided to the signal amplifier 122 via a second coaxial cable 127 or other type of wired, wireless, optical, or radio frequency connection operable to communicate radio frequency signals. The signal amplifier 122 can include one or more radio signal amplifiers for amplification and filtering of cellular signals. The downlink signal that has been amplified and filtered can be provided to the device antenna 124 via a first coaxial cable 125 or other type of radio frequency connection operable to communicate radio frequency signals. The device antenna 124 can communicate the downlink signal that has been amplified and filtered to the wireless device 110.

Similarly, the device antenna 124 can receive an uplink signal from the wireless device 110. The uplink signal can be provided to the signal amplifier 122 via the first coaxial cable 125 or other type of wired, wireless, optical, or radio frequency connection operable to communicate radio frequency signals. The signal amplifier 122 can include one or more radio signal amplifiers for amplification and filtering of cellular signals. The uplink signal that has been amplified and filtered can be provided to the node antenna 126 via the second coaxial cable 127 or other type of wired, wireless, optical, or radio frequency connection operable to communicate radio frequency signals. The node antenna 126 can communicate the uplink signal that has been amplified and filtered to a node, such as base station 130.

In one embodiment, the device antenna 124 and the node antenna 126 can be integrated as part of the repeater 120. Alternatively, the repeater 120 can be configured to be connected to a separate device antenna 124 or node antenna 126. The device antenna and the node antenna may be provided by a different provider than the repeater 120.

In one example, the repeater 120 can send uplink signals to a node and/or receive downlink signals from the node. While FIG. 1b shows the node as a base station 130, this is not intended to be limiting. The node can comprise a wireless wide area network (WWAN) access point (AP), a base station (BS), an evolved Node B (eNB), a next generation Node B (gNB), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one configuration, the repeater 120 used to amplify the uplink and/or a downlink signal can be a handheld booster. The handheld booster can be implemented in a sleeve of the wireless device 110. The wireless device sleeve may be attached to the wireless device 110, but may be removed as needed. In this configuration, the repeater 120 can automatically power down or cease amplification when the wireless device 110 approaches a particular base station. In other words, the repeater 120 may determine to stop performing signal amplification when the quality of uplink and/or downlink signals is above a defined threshold based on a location of the wireless device 110 in relation to the base station 130.

In one example, the repeater 120 can include a battery to provide power to various components, such as the signal amplifier 122, the device antenna 124, and the node antenna 126. The battery can also power the wireless device 110 (e.g., phone or tablet). Alternatively, the repeater 120 can receive power from the wireless device 110.

In one configuration, the repeater 120 can be a Federal Communications Commission (FCC)-compatible consumer repeater. As a non-limiting example, the repeater 120 can be compatible with FCC Part 20 or 47 Code of Federal Regulations (C.F.R.) Part 20.21 (Mar. 21, 2013). In addition, the handheld booster can operate on the frequencies used for the provision of subscriber-based services under parts 22 (Cellular), 24 (Broadband PCS), 27 (AWS-1, 700 megahertz (MHz) LowerA-E Blocks, and 700 MHz Upper C Block), and 90 (Specialized Mobile Radio) of 47 C.F.R. The repeater 120 can be configured to automatically self-monitor its operation to ensure compliance with applicable noise and gain limits. The repeater 120 can either self-correct or shut down automatically if the repeater's operations violate the regulations defined in 47 CFR Part 20.21. While a repeater that is compatible with FCC regulations is provided as an example, it is not intended to be limiting. The repeater can be configured to be compatible with other governmental regulations based on the location where the repeater is configured to operate.

In one configuration, the repeater 120 can improve the wireless connection between the wireless device 110 and the base station 130 (e.g., cell tower) or another type of wireless wide area network (WWAN) access point (AP) by amplifying desired signals relative to a noise floor. The repeater 120 can boost signals for cellular standards, such as the Third Generation Partnership Project (3GPP) Long Term Evolution (LTE) Release 8, 9, 10, 11, 12, 13, 14, or 15 standards or Institute of Electronics and Electrical Engineers (IEEE) 802.16. In one configuration, the repeater 120 can boost signals for 3GPP LTE Release 15.0.0 (January 2018) or other desired releases.

The repeater 120 can boost signals from the 3GPP Technical Specification (TS) 36.101 (Release 15 Sep. 2017) bands or LTE frequency bands. For example, the repeater 120 can boost signals from the LTE frequency bands: 2, 4, 5, 12, 13, 17, 25, and 26. In addition, the repeater 120 can boost selected frequency bands based on the country or region in which the repeater is used, including any of bands 1-85 or other bands, as disclosed in 3GPP TS 36.104 V15.3.0 (2018 July).

In another configuration, the repeater 120 can boost signals from the 3GPP Technical Specification (TS) 38.101 (Release 15 Dec. 2017) bands or 5G frequency bands. In addition, the repeater 120 can boost selected frequency bands based on the country or region in which the repeater is used, including any of bands n1-n86, n257-n261, or other bands, as disclosed in 3GPP TS 38.104 V15.3.0 (2018 September).

Time Division Duplex (TDD) systems can be operable to transmit during specific time durations and receive during other specific time durations. Citizens Broadband Radio Service (CBRS) bands 48 and 49 are cellular 3GPP TDD frequency bands. CBRS band 48 can have an operating range between 3550 megahertz (MHz)-3700 MHz, and CBRS band 49 can have an operating range between 3550 MHz-3700 MHz. CBRS bands 48 and 49 have an additional layer of complexity with respect to priority levels. The priority levels can include incumbent access (e.g. military, satellite, broadband), priority access, and general authorized access. A cellular repeater on CBRS bands 48 and 49 can be assumed to be general authorized access—and therefore should only repeat when authorized.

In one example, a TDD repeater can be configured to indicate when general authorized access is permitted. The repeater can be configured to be active when general authorized access is permitted and the repeater can be configured to be inactive otherwise. The general authorized access indication can be through a demodulating integrated circuit such as a modem or can be received from an external device, such as a user equipment (UE) via a Bluetooth connection. In another example, a repeater can be configured to operate in the cases of incumbent access, priority access, or general authorized access.

In one example, a repeater can be configured to receive an access level indicator from one or more of a base station or a user equipment (UE). The repeater can be further configured to identify an access level based on the access level indicator. The repeater can be further configured to activate the repeater when the access level permits repeater access; or deactivate the repeater when the access level prohibits repeater access.

A repeater can comprise a first antenna port and a second antenna port. The repeater can further comprise a frequency division duplex (FDD) first-direction amplification and filtering path coupled between the first antenna port and the second antenna port. The repeater can further comprise an FDD second-direction amplification and filtering path coupled between the first antenna port and the second antenna port. The FDD first-direction amplification and filtering path and second-direction amplification and filtering path can each have a different selected frequency band. The repeater can further comprise a time division duplex (TDD) first-direction amplification and filtering path coupled between the first antenna port and the second antenna port. The repeater can further comprise a TDD second-direction amplification and filtering path coupled between the first antenna port and the second antenna port. The TDD first-direction amplification and filtering path and second-direction amplification and filtering path can each have a same selected frequency band. The direction can be switched based on whether the TDD signal is uplink (UL) or downlink (DL).

Figure 2:
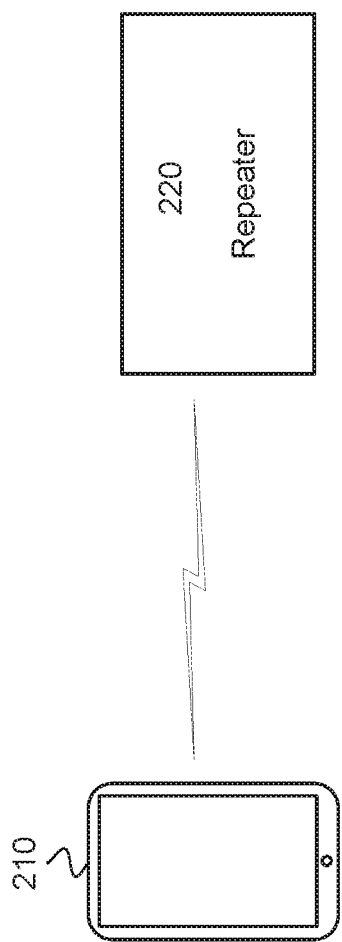
FIG. 2 illustrates a repeater in communication with a wireless device in accordance with an example.

As illustrated in FIG. 2, a cellular signal booster or repeater 220 can be configured to receive a signal from a user equipment (UE) or wireless device 210 via a wireless connection of the wireless device 210 with the repeater 220. The wireless connection of the wireless device 210 with the repeater 220 can be one or more of a wireless personal area network (W-PAN), which can include a Bluetooth v4.0, Bluetooth Low Energy, Bluetooth v4.1, or Bluetooth v4.2 configured radio access technology (RAT), or a wireless local area network (WLAN), which can include an Institute of Electronics and Electrical Engineers (IEEE) 802.11a, IEEE 802.11b, IEEE 802.11g, IEEE 802.11n, IEEE 802.11ac, or IEEE 802.11ad configured RAT. The repeater 220 can be configured to communicate with the wireless device 210 through a direct connection, a Near-Field Communication (NFC) configured radio access technology (RAT), an Ultra High Frequency (UHF) configured RAT, a TV White Space Band (TVWS) configured RAT, or any other industrial, scientific and medical (ISM) radio band configured RAT. Examples of such ISM bands include 2.4 gigahertz (GHz), 3.6 GHz, 4.9 GHz, 5 GHz, 5.9 GHz, or 6.1 GHz.

The repeater 220 can boost signals from the 3GPP Technical Specification (TS) 36.101 (Release 16 Sep. 2019) bands or LTE frequency bands. For example, the repeater 220 can boost signals from the LTE frequency bands: 2, 4, 5, 12, 13, 17, 25, and 26. In addition, the repeater 220 can boost selected frequency bands based on the country or region in which the repeater is used, including any of bands 1-53, 65-76, 85, 87, or 88, or other bands, as disclosed in 3GPP TS 36.104 V16.3.0 (September 2019), and depicted in Table 1:

TABLE 1

| LTE Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
| --- | --- | --- | --- |
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 (NOTE 1) | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |

TABLE 1-continued

| LTE Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23[1] | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD (NOTE 2) |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A | 1452 MHz-1496 MHz | FDD (NOTE 2) |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |
| 45 | 1447 MHz-1467 MHz | 1447 MHz-1467 MHz | TDD |
| 46 | 5150 MHz-5925 MHz | 5150 MHz-5925 MHz | TDD (NOTE 3, NOTE 4) |
| 47 | 5855 MHz-5925 MHz | 5855 MHz-5925 MHz | TDD |
| 48 | 3550 MHz-3700 MHz | 3550 MHz-3700 MHz | TDD |
| 49 | 3550 MHz-3700 MHz | 3550 MHz-3700 MHz | TDD (NOTE 8) |
| 50 | 1432 MHz-1517 MHz | 1432 MHz-1517 MHz | TDD |
| 51 | 1427 MHz-1432 MHz | 1427 MHz-1432 MHz | TDD |
| 52 | 3300 MHz-3400 MHz | 3300 MHz-3400 MHz | TDD |
| 53 | 2483.5 MHz-2495 MHz | 2483.5 MHz-2495 MHz | TDD |
| 65 | 1920 MHz-2010 MHz | 2110 MHz-2200 MHz | FDD |
| 66 | 1710 MHz-1780 MHz | 2110 MHz-2200 MHz | FDD (NOTE 5) |
| 67 | N/A | 738 MHz-758 MHz | FDD (NOTE 2) |
| 68 | 698 MHz-728 MHz | 753 MHz-783 MHz | FDD |
| 69 | N/A | 2570 MHz-2620 MHz | FDD (NOTE 2) |
| 70 | 1695 MHz-1710 MHz | 1995 MHz-2020 MHz | FDD6 |
| 71 | 663 MHz-698 MHz | 617 MHz-652 MHz | FDD |
| 72 | 451 MHz-456 MHz | 461 MHz-466 MHz | FDD |
| 73 | 450 MHz-455 MHz | 460 MHz-465 MHz | FDD |
| 74 | 1427 MHz-1470 MHz | 1475 MHz-1518 MHz | FDD |
| 75 | N/A | 1432 MHz-1517 MHz | FDD (NOTE 2) |
| 76 | N/A | 1427 MHz-1432 MHz | FDD (NOTE 2) |
| 85 | 698 MHz-716 MHz | 728 MHz-746 MHz | FDD |

TABLE 1-continued

| LTE Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 87 | 410 MHz-415 MHz | 420 MHz-425 MHz | FDD |
| 88 | 412 MHz-417 MHz | 422 MHz-427 MHz | FDD |

NOTE 1:
Band 6, 23 are not applicable.
NOTE 2:
Restricted to E-UTRA operation when carrier aggregation is configured. The downlink operating band is paired with the uplink operating band (external) of the carrier aggregation configuration that is supporting the configured Pcell.
NOTE 3:
This band is an unlicensed band restricted to licensed-assisted operation using Frame Structure Type 3.
NOTE 4:
Band 46 is divided into four sub-bands as in Table 5.5-1 A.
NOTE 5:
The range 2180-2200 MHz of the DL operating band is restricted to E-UTRA operation when carrier aggregation is configured.
NOTE 6:
The range 2010-2020 MHz of the DL operating band is restricted to E-UTRA operation when carrier aggregation is configured and TX-RX separation is 300 MHz. The range 2005-2020 MHz of the DL operating band is restricted to E-UTRA operation when carrier aggregation is configured and TX-RX separation is 295 MHz.
NOTE 7:
Void
NOTE 8:
This band is restricted to licensed-assisted operation using Frame Structure Type 3.

In another configuration, the repeater 220 can boost signals from the 3GPP Technical Specification (TS) 38.104 (Release 16 Sep. 2019) bands or 5G frequency bands. In addition, the repeater 220 can boost selected frequency bands based on the country or region in which the repeater is used, including any of bands n1-n86 in frequency range 1 (FR1), n257-n261 in frequency range 2 (FR2), or other bands, as disclosed in 3GPP TS 38.104 V16.1.0 (September 2019), and depicted in Table 2 and Table 3:

TABLE 2

| NR operating band | Uplink (UL) operating band BS receive/UE transmit $F_{UL,\ low}$-$F_{UL,\ high}$ | Downlink (DL) operating band BS transmit/UE receive $F_{DL,\ low}$-$F_{DL,\ high}$ | Duplex mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n14 | 788 MHz-798 MHz | 758 MHz-768 MHz | FDD |
| n18 | 815 MHz-830 MHz | 860 MHz-875 MHz | FDD |
| n20 | 832 MHz-862 MHz | 791 MHz-821 MHz | FDD |
| n25 | 1850 MHz-1915 MHz | 1930 MHz-1995 MHz | FDD |
| n28 | 703 MHz-748 MHz | 758 MHz-803 MHz | FDD |
| n29 | N/A | 717 MHz-728 MHz | SDL |
| n30 | 2305 MHz-2315 MHz | 2350 MHz-2360 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n48 | 3550 MHz-3700 MHz | 3550 MHz-3700 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n65 | 1920 MHz-2010 MHz | 2110 MHz-2200 MHz | FDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |

TABLE 2-continued

| NR operating band | Uplink (UL) operating band BS receive/UE transmit $F_{UL,\ low}$-$F_{UL,\ high}$ | Downlink (DL) operating band BS transmit/UE receive $F_{DL,\ low}$-$F_{DL,\ high}$ | Duplex mode |
|---|---|---|---|
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |
| n89 | 824 MHz-849 MHz | N/A | SUL |
| [n90] | 2496 MHz-2690 MHz | 2496 MHz-2690 MHz | TDD |

TABLE 3

| NR operating band | Uplink (UL) and Downlink (DL) operating band BS transmit/receive UE transmit/receive $F_{UL,\ low}$-$F_{UL,\ high}$ $F_{DL,\ low}$-$F_{DL,\ high}$ | Duplex mode |
|---|---|---|
| n257 | 26500 MHz-29500 MHz | TDD |
| n258 | 24250 MHz-27500 MHz | TDD |
| n260 | 37000 MHz-40000 MHz | TDD |
| n261 | 27500 MHz-28350 MHz | TDD |

The 3GPP LTE standard is configured to transmit and receive TDD signals based on a subframe granularity. A predetermined uplink-downlink configuration can be used to determine which subframes are used for uplink and which are used for downlink. In another example, as illustrated in FIG. 3a, the 3GPP LTE frame structure is configured with a radio frame of length 10 milliseconds (ms) that can include two half-frames of length 5 ms each. Each half-frame can include 5 subframes of length 1 ms. Each subframe can include two slots of length 0.5 ms each. The uplink-downlink configuration in a cell can vary between frames and controls in which subframes uplink or downlink transmission can take place in the current frame. The supported uplink-downlink configurations can be configured as listed in FIG. 3a where, for each subframe in a radio frame, "D" can denote a downlink subframe reserved for downlink transmissions, "U" can denote an uplink subframe reserved for uplink transmissions, and "S" can denote a special subframe. The special subframes are used to communicate control information. Uplink-downlink configurations with both 5 ms and 10 ms downlink-to-uplink switch-point periodicity can be supported. In the case of 5 ms downlink-to-uplink switch-point periodicity, the special subframe can exist in both half-frames (slots). In the case of 10 ms downlink-to-uplink switch-point periodicity, the special subframe can exist in the first half-frame only. In the 3GPP LTE Version 8 standard, there are seven different preconfigured uplink-downlink configurations, numbered between 0 and 6, as illustrated in FIG. 3a.

A 3GPP LTE base station can be configured to transmit which of the seven UL/DL configurations will be used. In another example, a repeater can be configured to receive the UL/DL configuration from the base station. The configuration information is typically transmitted from the base station via higher layer signaling, such as radio resource control (RRC) signaling. In another example, for each radio frame, the repeater can demodulate and/or decode control information in a physical downlink control channel (PDCCH) or physical downlink shared channel (PDSCH) using a downlink control information (DCI) format type to receive UL/DL configuration. In one example, a TDD switch controller can be used to receive the 3GPP LTE UL/DL configuration information from a base station for a cellular signal associated with the base station. Alternatively, a UE can receive and decode the UL/DL configuration information from the base station (i.e. evolved Node B or eNB) and communicate the UL/DL configuration information to the repeater via a wireless transmission using a predetermined wireless standard, as previously discussed.

FIGS. 3b and 3c provide example UL/DL configurations for 3GPP 5G communication, as described in 3GPP Rel. 15.0.0. In 5G communication, a frame of 10 ms duration can include ten subframes of 1 ms duration. Each frame can include two equally-sized half-frames of five subframes. Half-frame 0 can include subframes 0-4 and half-frame 1 can include subframes 5-9. There can be one set of frames in the uplink and one set of frames in the downlink. Orthogonal frequency-division multiplexing (OFDM) symbols in a slot can be classified as 'downlink', 'flexible', or 'uplink'. In a slot in a downlink frame, downlink transmissions can only occur in 'downlink' or 'flexible' symbols. In a slot in an uplink frame, the uplink transmission can only occur in 'uplink' or 'flexible' symbols.

In another example, as illustrated in FIGS. 3b and 3c, a slot format can be identified by a corresponding format index ranging from 0 to 55 where 'D' can denote a downlink symbol, 'U' can denote an uplink symbol, and 'F' can denote a flexible symbol. In another example, the symbol number in a slot can range from 0 to 13. In another example, slot format indices ranging from 56 to 254 can be reserved. In another example, a slot format index 255 can have a slot format as disclosed in 3GPP TS 38.213 V15.3.0 (2018 September).

In another example, a repeater can be configured to receive the slot format per slot over a number of slots as indicated by one or more higher layer parameters via higher layer signaling (such as RRC signaling). The higher layer parameters can provide a reference subcarrier spacing, a slot configuration period, a number of downlink symbols, or a number of uplink symbols. In another example, the repeater can be configured to receive a higher layer parameter that can override only the flexible symbols per slot over a number of slots as provided by another higher layer parameter.

In another example, a repeater can be configured to receive a higher layer parameter that includes a set of slot format combinations, in which each slot format combination can include one or more slot formats as illustrated in FIGS. 3b and 3c. In another example, a repeater can be configured to demodulate and/or decode control information on a physical control channel or physical shared channel that includes a slot format. In one example, a TDD switch controller can be used to receive the 3GPP 5G UL/DL configuration information from a base station for a cellular signal associated with the base station.

Figure 4:
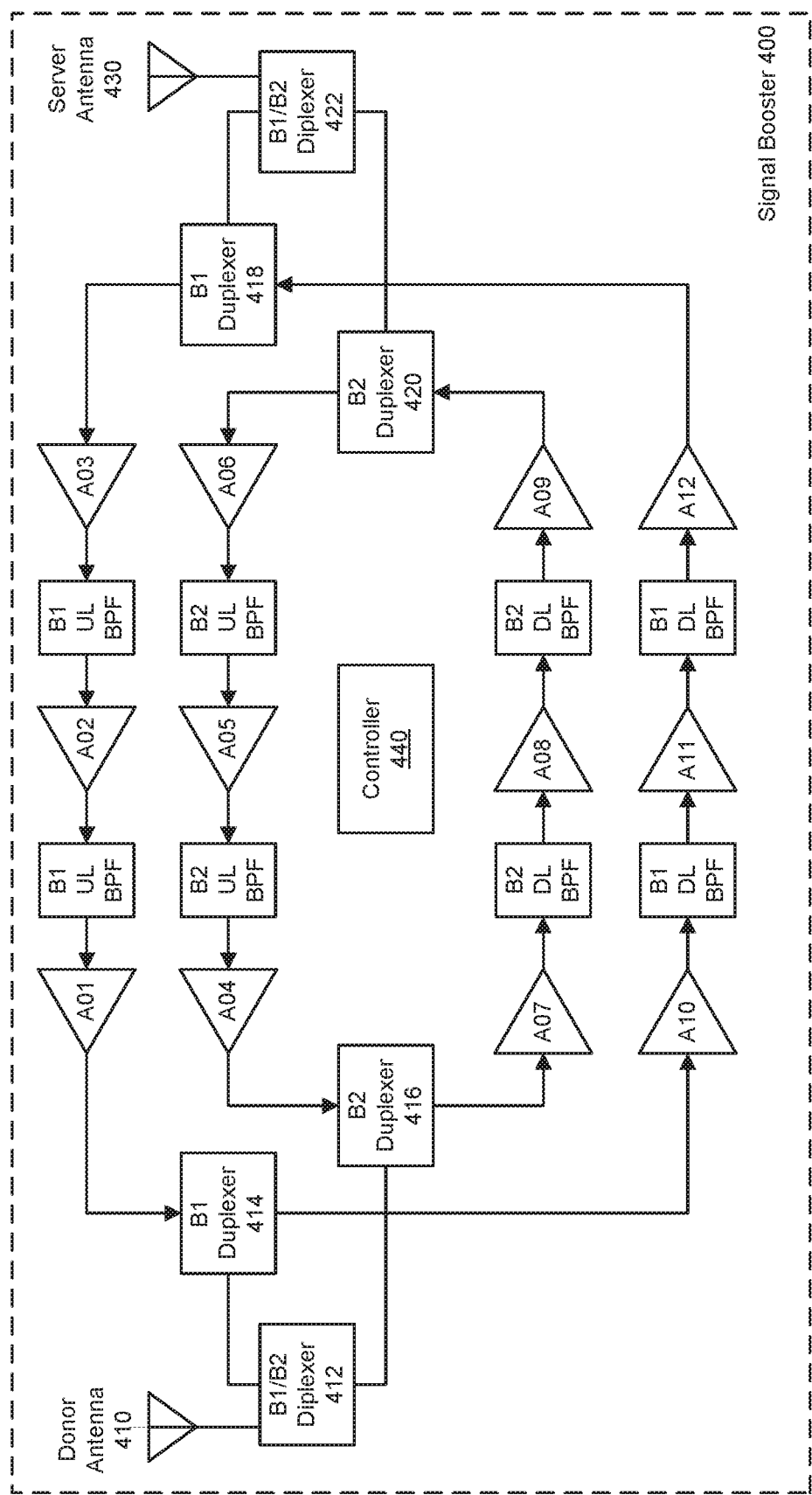
FIG. 4 illustrates a frequency division duplex (FDD) multiband repeater in accordance with an example.

As illustrated in FIG. 4, in another example, a repeater can be configured as a multiband bi-directional FDD wireless signal booster 400 configured to amplify an uplink signal and a downlink signal in multiple bands or channels using a separate signal path for one or more uplink frequency bands or channels and one or more downlink frequency bands or channels. In one embodiment, adjacent bands can be included on a same signal path.

A donor antenna 410, or an integrated node antenna, can receive a downlink signal. For example, the downlink signal can be received from a base station. The downlink signal can be provided to a first B1/B2 diplexer 412, wherein B1 represents a first frequency band and B2 represents a second frequency band. The first B1/B2 diplexer 412 can direct selected portions of a received signal to a B1 downlink signal path and a B2 downlink signal path. A downlink signal that is associated with B1 can travel along the B1 downlink signal path to a first B1 duplexer 414. A portion of the received signal that is within the B2 can travel along the B2 downlink signal path to a first B2 duplexer 416. After passing the first B1 duplexer 414, the downlink signal can travel through a series of amplifiers (e.g. A10, A11, and A12) and downlink bandpass filters (e.g. B1 DL BPF) to a second B1 duplexer 418. In addition, the B2 downlink signal passing through the B2 duplexer 416, can travel through a series of amplifiers (e.g. A07, A08, and A09) and downlink band pass filters (e.g. B2 DL BPF) to a second B2 duplexer 420. At this point, the downlink signals (B1 or B2) have been amplified and filtered in accordance with the type of amplifiers and BPFs included in the multiband bi-directional wireless signal booster 400. The downlink signals from the second B1 duplexer 418 or the second B2 duplexer 420, respectively, can be provided to a second B1/B2 diplexer 422. The second B1/B2 diplexer 422 can direct the B1/B2 amplified downlink signal to a server antenna 430, or an integrated device antenna. The server antenna 430 can communicate the amplified downlink signal to a wireless device, such as a UE.

In another example, the server antenna 430 can receive an uplink (UL) signal from a wireless device. The uplink signal can include a first frequency range, such as a Band 1 signal and a second frequency range, such as a Band 2 signal. The uplink signal can be provided to the second B1/B2 diplexer 422. The second B1/B2 diplexer 422 can direct the signals, based on their frequency, to a B1 uplink signal path and a B2 uplink signal path. An uplink signal that is associated with B1 can travel along the B1 uplink signal path to a second B1 duplexer 418, and an uplink signal that is associated with B2 can travel along the B2 uplink signal path to a second B2 duplexer 420. The second B1 duplexer 418 can direct the B1 uplink signal to travel through a series of amplifiers (e.g. A01, A02, and A03) and uplink bandpass filters (B1 UL BPF) to the first B1 duplexer 414. In addition, the second B2 duplexer 420 can direct the B2 uplink signal to travel through a series of amplifiers (e.g. A04, A05, and A06) and downlink band pass filters (B2 UL BPF) to the first B2 duplexer 416. At this point, the uplink signals (B1 and B2) have been amplified and filtered in accordance with the type of amplifiers and BPFs included in the bi-directional wireless signal booster 400. The uplink signals from the first B1 duplexer 414 and the first B2 duplexer 416, respectively, can be provided to the first B1/B2 diplexer 412. The first B1/B2 diplexer 412 can direct the B1 and B2 amplified uplink signals to the donor antenna 410, or an integrated device antenna. The donor antenna 410, or donor antenna, can communicate the amplified uplink signals to a base station.

Figure 5:
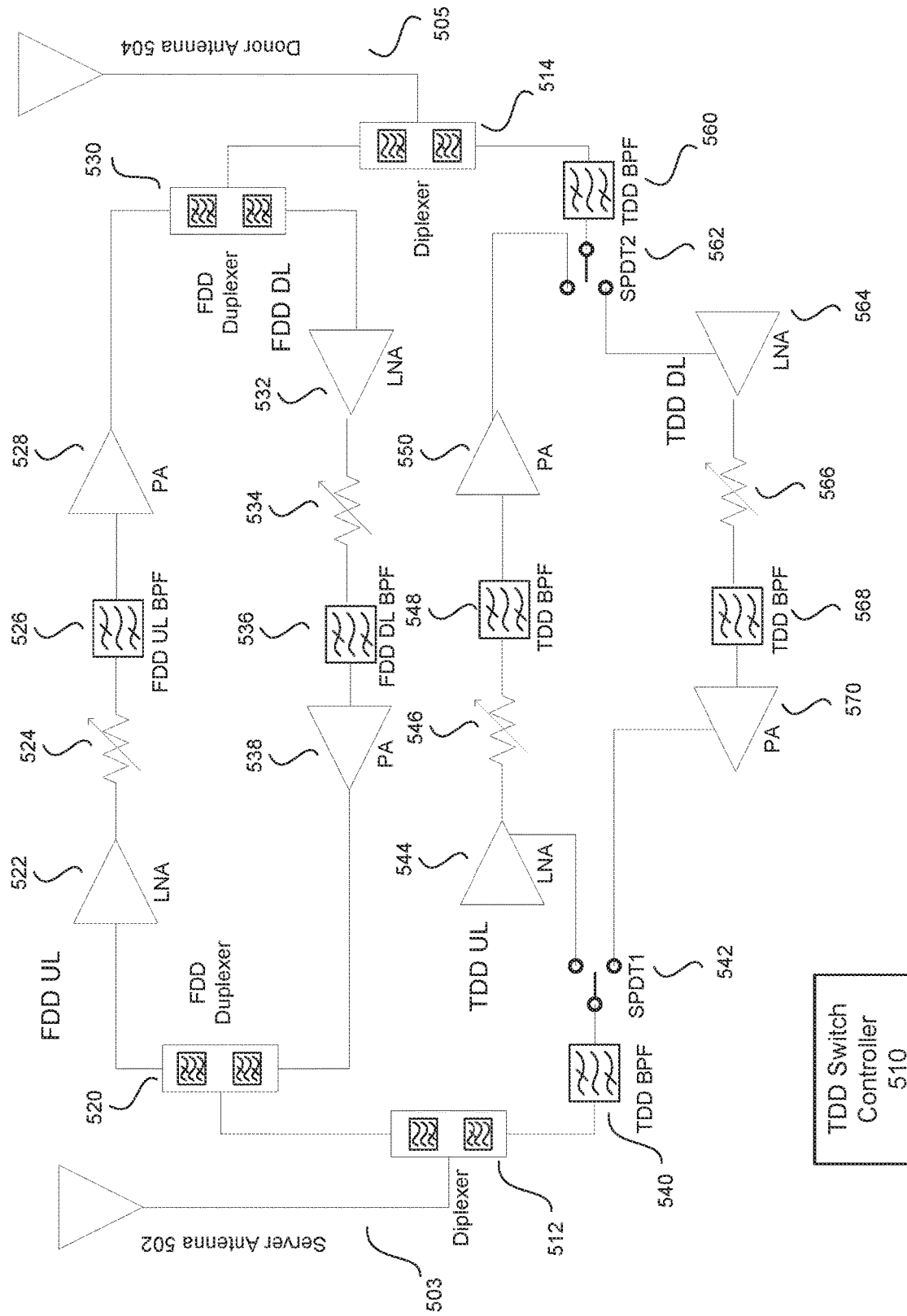
FIG. 5 illustrates a frequency division duplex (FDD)/time division duplex (TDD) integrated repeater in accordance with an example.

As illustrated in FIG. 5, in another example, a repeater can be a frequency division duplex (FDD)/time division duplex (TDD) integrated repeater. The repeater can be configured to be connected to a server antenna 502 and a donor antenna 504. The server antenna 502 can receive an uplink signal from a wireless device. The server antenna 502 can be coupled to a server antenna port 503. The uplink signal received at the server antenna port 503 can be directed to diplexer 512. The diplexer 512 can direct the uplink signal, based on its frequency, to an FDD uplink path that includes the FDD duplexer 520. The diplexer 512 can be coupled to an FDD duplexer 520.

In another example, the uplink signal can travel along the FDD uplink path. The FDD UL path can comprise the FDD duplexer 520, one or more of a low-noise amplifier (LNA) 522, a variable attenuator 524, an FDD UL band-pass filter (BPF) 526, and/or a power amplifier 528. In another example, the power amplifier 528 can comprise a variable gain power amplifier, a fixed gain power amplifier, or a gain block. In another example, the FDD UL BPF 526 can be configured to communicate one or more of 3GPP FDD frequency bands 2, 4, 5, 12, 13, 17, 25, 26, or 71. In another example, the FDD UL BPF 526 can be configured to communicate one or more of 3GPP FDD frequency bands 1-28, 30, 31, 65, 66, 68, 70-74, or 85. In another example, the FDD UL BPF 526 can be configured to communicate a selected channel within a 3GPP FDD band. After traveling along the FDD uplink path, the uplink signal can be amplified and filtered in accordance with the type of amplifiers and BPFs included along the FDD uplink path. At this point, the uplink signal can be directed to the FDD duplexer 530. The FDD duplexer 530 can direct the amplified and/or filtered uplink signal to the diplexer 514. The diplexer 514 can be coupled to a donor antenna port 505. The donor antenna port can be configured to be connected to one or more donor antennas 504. The uplink signal can be directed from the diplexer 514 to the donor antenna port 505. The uplink signal can be directed from the donor antenna port 505 to the donor antenna 504. The donor antenna 504 can communicate the amplified and/or filtered uplink signal to a base station, such as an evolved Node B (eNB) or a next generation Node B (gNB).

In another example, a downlink signal from a base station can be directed to a donor antenna port 505. The donor antenna port 505 can be coupled to a diplexer 514. The diplexer 514 can be coupled to an FDD duplexer 530. The downlink signal received at a donor antenna 504 from the base station can be directed to the diplexer 514. The diplexer 514 can direct the downlink signal, based on its frequency, to an FDD downlink path.

In another example, the FDD downlink signal can travel along the FDD downlink path. The FDD DL path can comprise one or more of a low-noise amplifier (LNA) 532, a variable attenuator 534, an FDD DL band-pass filter (BPF) 536, and/or a power amplifier 538. In another example, the power amplifier 538 can comprise a variable gain power amplifier, a fixed gain power amplifier, or a gain block. In another example, the FDD DL BPF 536 can be configured to communicate one or more of 3GPP FDD frequency bands 2, 4, 5, 12, 13, 17, 25, 26, or 71. In another example, the FDD DL BPF 536 can be configured to communicate one or more of 3GPP FDD frequency bands 1-28, 30, 31, 65, 66, 68, 70-74, or 85. In another example, the FDD DL BPF 536 can be configured to communicate a selected channel within a 3GPP FDD band. After traveling along the FDD downlink path, the downlink signal can be amplified and filtered in accordance with the type of amplifiers and BPFs included along the FDD downlink path. At this point, the downlink signal can be directed to the FDD duplexer 520. The FDD duplexer 520 can direct the amplified and/or filtered downlink signal to the diplexer 512. The diplexer 512 can be coupled to a server antenna port 503. The downlink signal can be directed from the diplexer 512 to the server antenna port 503. The server antenna port 503 can be configured to be connected to a server antenna 502. The downlink signal can be directed from the server antenna port 503 to the server antenna 502. The server antenna 502 can communicate the amplified and/or filtered downlink signal to a wireless device.

In another example, the server antenna 502 can receive a TDD uplink signal from a wireless device. The server antenna 502 can be configured to be coupled to a server antenna port 503. The server antenna port 503 can be coupled to a diplexer 512. The diplexer 512 can be coupled to a TDD band-pass filter (BPF) 540. In another example, the TDD BPF 540 can be configured to communicate one or more of 3GPP TDD frequency bands 41, 48, or 49. In another example, the TDD BPF 540 can be configured to communicate one or more of 3GPP TDD frequency bands 33 through 52. In another example, the TDD BPF 540 can be configured to communicate a selected channel within a 3GPP TDD band. The TDD uplink signal received at the server antenna 502 from the wireless device can be directed to diplexer 512. Based on the frequency band, the diplexer 512 can direct the TDD uplink signal, based on its frequency, to a single pole double throw (SPDT) switch 542.

In another example, the SPDT switch 542 can direct the uplink signal to the TDD uplink path. The TDD UL path can comprise one or more of a low-noise amplifier (LNA) 544, a variable attenuator 546, a TDD band-pass filter (BPF) 548, or a power amplifier 550. In another example, the power amplifier 550 can comprise a variable gain power amplifier, a fixed gain power amplifier, or a gain block. In another example, the TDD BPF 548 can be configured to communicate one or more of 3GPP TDD frequency bands 41, 48, or 49. In another example, the TDD BPF 548 can be configured to communicate one or more of 3GPP TDD frequency bands 33 through 52. In another example, the TDD BPF 548 can be configured to communicate a selected channel within a 3GPP TDD band. After traveling along the TDD uplink path, the uplink signal can be amplified and filtered in accordance with the type of amplifiers and BPFs included along the TDD uplink path. At this point, the uplink signal can be directed to a single pole double throw (SPDT)

switch 562. The SPDT switch 562 can direct the uplink signal to a TDD BPF 560. The TDD BPF 560 can direct the amplified and/or filtered uplink signal to the diplexer 514. The diplexer 514 can be coupled to a donor antenna port 505. The donor antenna port can be configured to be coupled to a donor antenna. The uplink signal can be directed from the diplexer 514 to the donor antenna port 505. The uplink signal can be directed from the donor antenna port 505 to the donor antenna 504. The donor antenna 504 can communicate the amplified and/or filtered uplink signal to a base station.

In another example, the donor antenna 504 can receive a TDD downlink signal from a base station. The donor antenna 504 can be coupled to a donor antenna port 505. The donor antenna port 505 can be coupled to a diplexer 514. The diplexer 514 can be coupled to the TDD BPF 560. In another example, the TDD BPF 560 can be configured to communicate one or more of 3GPP TDD frequency bands 41, 48, or 49. In another example, the TDD BPF 560 can be configured to communicate one or more of 3GPP TDD frequency bands 33 through 52. In another example, the TDD BPF 560 can be configured to communicate a selected channel within a 3GPP TDD band. The TDD downlink signal received at the donor antenna 504 from the base station can be directed to diplexer 514. The diplexer 514 can direct the TDD downlink signal, based on its frequency, to a single pole double throw (SPDT) switch 562.

In another example, the TDD downlink signal can travel along the TDD downlink path. The TDD DL path can comprise one or more of a low-noise amplifier (LNA) 564, a variable attenuator 566, a TDD band-pass filter (BPF) 568, or a power amplifier 570. In another example, the power amplifier 570 can comprise a variable gain power amplifier, a fixed gain power amplifier, or a gain block. In another example, the TDD BPF 568 can be configured to communicate one or more of 3GPP TDD frequency bands 41, 48, or 49. In another example, the TDD BPF 568 can be configured to communicate one or more of 3GPP TDD frequency bands 33 through 52. In another example, the TDD BPF 568 can be configured to communicate a selected channel within a 3GPP TDD band. After traveling along the TDD downlink path, the downlink signal can be amplified and filtered in accordance with the type of amplifiers and BPFs included along the TDD downlink path. At this point, the downlink signal can be directed to the SPDT switch 542. The SPDT switch 542 can direct the amplified and/or filtered downlink signal to the TDD BPF 540. The TDD BPF 540 can direct the amplified and/or filtered downlink signal to the diplexer 512. The diplexer 512 can be coupled to a server antenna port 503. The server antenna port 503 can be configured to be connected to a server antenna 502. The TDD downlink signal can be directed from the diplexer 512 to the server antenna port 503. The TDD downlink signal can be directed from the server antenna port 503 to the server antenna 502. The server antenna 502 can communicate the amplified and/or filtered downlink signal to a wireless device.

In another example, a repeater can further comprise a TDD switch controller 510. The TDD switch controller can be configured to receive UL/DL configuration information from a base station or UE, as previously discussed. Alternatively, the UL/DL configuration information may be received at a different location within the repeater and communicated to the TDD switch controller 510. The repeater can be configured to switch the SPDT switch 542 to pass a first-direction or uplink TDD signal from the server antenna port 503 to the TDD UL path and switch the SPDT switch 562 to pass the first-direction or uplink TDD signal to the donor antenna port 505. In another example, the repeater can be configured to switch the SPDT switch 562 to pass a second-direction or downlink TDD signal from the donor antenna port 505 to the TDD DL path and switch the SPDT switch 542 to pass the second-direction or downlink TDD signal to the server antenna port 503.

In another example, the repeater can be configured to switch the SPDT switch 542 to pass a first-direction or uplink TDD signal from the server antenna port 503 to the TDD UL path and switch the SPDT switch 562 to pass a second-direction or downlink TDD signal from the donor antenna port 505 to the TDD DL path. In another example, the repeater can be configured to switch the SPDT switch 562 to pass a second-direction or downlink TDD signal from the donor antenna port 505 to the TDD DL path and switch the SPDT switch 542 to pass the second-direction or downlink TDD signal to the server antenna port.

In another example, the TDD switch controller 510 can comprise one or more of a modem, a field-programmable gate array (FPGA), or an application-specific integrated circuit (ASIC) that is configured to receive UL/DL configuration information from a base station or a UE and send a signal to a switch. The TDD switch controller can be configured to switch between a DL configuration and an UL configuration in a 1 ms subframe basis for 3GPP LTE. The TDD switch controller can be configured to switch between a DL configuration and an UL configuration on a symbol basis for 3GPP 5G, wherein the duration of a symbol can vary based on the numerology, such as the subcarrier spacing or cyclic prefix, of the 5G signal.

Figure 6:
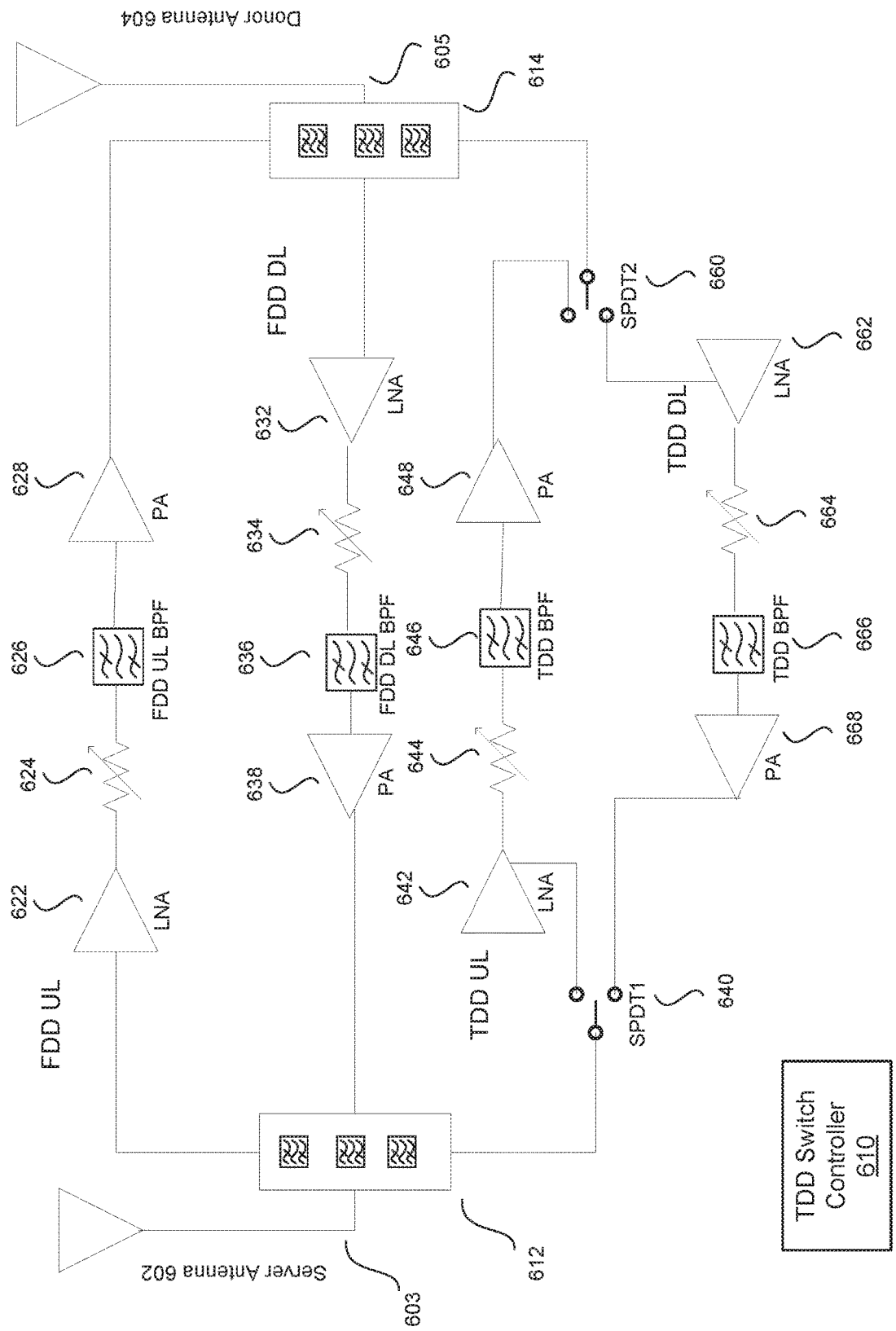
FIG. 6 illustrates a frequency division duplex (FDD)/time division duplex (TDD) integrated repeater in accordance with an example.

As illustrated in FIG. 6, in another example, a repeater can be a frequency division duplex (FDD)/time division duplex (TDD) integrated repeater. The repeater can be configured to be coupled to a server antenna 602 and a donor antenna 604. The server antenna 602 can receive an uplink signal from a wireless device. The server antenna 602 can be configured to be coupled to a server antenna port 603. The server antenna port 603 can be coupled to a multiplexer 612. The uplink signal directed to the server antenna port 603 from the wireless device can be directed to multiplexer 612. The multiplexer 612 can direct the uplink signal, based on its frequency, to an FDD uplink path.

In another example, the FDD uplink signal can travel along the FDD uplink path. The FDD UL path can comprise one or more of a low-noise amplifier (LNA) 622, a variable attenuator 624, an FDD UL band-pass filter (BPF) 626, or a power amplifier 628. In another example, the power amplifier 628 can comprise a variable gain power amplifier, a fixed gain power amplifier, or a gain block. In another example, the FDD UL BPF 626 can be configured to communicate one or more of 3GPP FDD frequency bands 2, 4, 5, 12, 13, 17, 25, 26, or 71. In another example, the FDD UL BPF 626 can be configured to communicate one or more of 3GPP FDD frequency bands 1-28, 30, 31, 65, 66, 68, 70-74, or 85. In another example, the FDD UL BPF 626 can be configured to communicate a selected channel within a 3GPP FDD band. After traveling along the FDD uplink path, the FDD uplink signal can be amplified and filtered in accordance with the type of amplifiers and BPFs included along the FDD uplink path. At this point, the uplink signal can be directed to the multiplexer 614. The multiplexer 614 can be coupled to a donor antenna port 605. The uplink signal can be directed from the multiplexer 614 to the donor antenna port 605. The uplink signal can be directed from the donor antenna port 605 to the donor antenna 604. The donor antenna 604 can communicate the amplified and/or filtered uplink signal to a base station.

In another example, the donor antenna 604 can receive a downlink signal from a base station. The donor antenna 604 can be configured to be coupled to a donor antenna port 605. The donor antenna port 605 can be coupled to a multiplexer 614. The downlink signal received at the donor antenna 604 from the base station can be directed to multiplexer 614. The multiplexer 614 can direct the downlink signal, based on its frequency, to an FDD downlink path.

In another example, the FDD downlink signal can travel along the FDD downlink path. The FDD DL path can comprise one or more of a low-noise amplifier (LNA) 632, a variable attenuator 634, an FDD DL band-pass filter (BPF) 636, or a power amplifier 638. In another example, the power amplifier 638 can comprise a variable gain power amplifier, a fixed gain power amplifier, or a gain block. In another example, the FDD DL BPF 636 can be configured to communicate one or more of 3GPP FDD frequency bands 2, 4, 5, 12, 13, 17, 25, 26, or 71. In another example, the FDD DL BPF 636 can be configured to communicate one or more of 3GPP FDD frequency bands 1-28, 30, 31, 65, 66, 68, 70-74, or 85. In another example, the FDD DL BPF 636 can be configured to communicate a selected channel within a 3GPP FDD band. After traveling along the FDD downlink path, the FDD downlink signal can be amplified and filtered in accordance with the type of amplifiers and BPFs included along the FDD downlink path. At this point, the FDD downlink signal can be directed to the multiplexer 612. The multiplexer 612 can be coupled to a server antenna port 603. The FDD downlink signal can be directed from the multiplexer 612 to the server antenna port 603. The FDD downlink signal can be directed from the server antenna port 603 to the server antenna 602. The server antenna 602 can communicate the amplified and/or filtered FDD downlink signal to a wireless device.

In another example, the server antenna 602 can receive an uplink signal from a wireless device. The server antenna 602 can be coupled to a server antenna port 603. The server antenna port 603 can be coupled to a multiplexer 612. The uplink signal received at the server antenna 602 from the wireless device can be directed to multiplexer 612. The multiplexer 612 can direct the uplink signal, based on its frequency, to a single pole double throw (SPDT) switch 640.

In another example, the SPDT switch 640 can direct the TDD uplink signal to the TDD uplink path. The TDD UL path can comprise one or more of a low-noise amplifier (LNA) 642, a variable attenuator 644, a TDD band-pass filter (BPF) 646, or a power amplifier 648. In another example, the power amplifier 648 can comprise a variable gain power amplifier, a fixed gain power amplifier, or a gain block. In another example, the TDD BPF 646 can be configured to communicate one or more of 3GPP TDD frequency bands 41, 48, or 49. In another example, the TDD BPF 646 can be configured to communicate one or more of 3GPP TDD frequency bands 33 through 52. In another example, the TDD BPF 646 can be configured to communicate a selected channel within a 3GPP TDD band. After traveling along the TDD uplink path, the TDD uplink signal can be amplified and filtered in accordance with the type of amplifiers and BPFs included along the TDD uplink path. At this point, the TDD uplink signal can be directed to a single pole double throw (SPDT) switch 660. The SPDT switch 660 can direct the TDD uplink signal to a multiplexer 614. The multiplexer 614 can be coupled to a donor antenna port 605. The TDD uplink signal can be directed from the multiplexer 614 to the donor antenna port 605. The TDD uplink signal can be directed from the donor antenna port 605 to the donor antenna 604. The donor antenna 604 can communicate the amplified and/or filtered TDD uplink signal to a base station.

In another example, the donor antenna 604 can receive a downlink signal from a base station. The donor antenna 604 can be configured to be coupled to a donor antenna port 605. The donor antenna port 605 can be coupled to a multiplexer 614. The downlink signal received at the donor antenna 604 from the base station can be directed to multiplexer 614. The multiplexer 614 can direct the TDD downlink signal, based on its frequency, to a single pole double throw (SPDT) switch 660.

In another example, the TDD downlink signal can travel along the TDD downlink path. The TDD DL path can comprise one or more of a low-noise amplifier (LNA) 662, a variable attenuator 664, a TDD band-pass filter (BPF) 666, or a power amplifier 668. In another example, the power amplifier 668 can comprise a variable gain power amplifier, a fixed gain power amplifier, or a gain block. In another example, the TDD BPF 666 can be configured to communicate one or more of 3GPP TDD frequency bands 41, 48, or 49. In another example, the TDD BPF 666 can be configured to communicate one or more of 3GPP TDD frequency bands 33 through 52. In another example, the TDD BPF 666 can be configured to communicate a selected channel within a 3GPP TDD band. After traveling along the TDD downlink path, the TDD downlink signal can be amplified and filtered in accordance with the type of amplifiers and BPFs included along the TDD downlink path. At this point, the TDD downlink signal can be directed to the SPDT switch 640. The SPDT switch 640 can direct the amplified and/or filtered TDD downlink signal to the multiplexer 612. The multiplexer 612 can be coupled to a server antenna port 603. The TDD downlink signal can be directed from the multiplexer 612 to the server antenna port 603. The TDD downlink signal can be directed from the server antenna port 603 to the server antenna 602. The server antenna 602 can communicate the amplified and/or filtered TDD downlink signal to a wireless device.

In another example, a repeater can further comprise a TDD switch controller 610. The TDD switch controller can be configured to receive UL/DL configuration information from a base station or UE, as previously discussed. Alternatively, the UL/DL configuration information may be received at a different location within the repeater and communicated to the TDD switch controller 610. The repeater can be configured to switch the SPDT switch 640 to pass a first-direction or uplink TDD signal from the server antenna port 603 to the TDD UL path and switch the SPDT switch 660 to pass the first-direction or uplink TDD signal to the donor antenna port 605. In another example, the repeater can be configured to switch the SPDT switch 660 to pass a second-direction or downlink TDD signal from the donor antenna port 605 to the TDD DL path and switch the SPDT switch 640 to pass the second-direction or downlink TDD signal to the server antenna port 603.

In another example, the repeater can be configured to switch the SPDT switch 640 to pass a first-direction or uplink TDD signal from the server antenna port 603 to the TDD UL path and switch the SPDT switch 660 to pass a second-direction or downlink TDD signal from the donor antenna port 605 to the TDD DL path. In another example, the repeater can be configured to switch the SPDT switch 660 to pass a second-direction or downlink TDD signal from the donor antenna port 605 to the TDD DL path and switch the SPDT switch 640 to pass the second-direction or downlink TDD signal to the first antenna port.

In another example, the TDD switch controller 610 can comprise one or more of a modem, a field-programmable gate array (FPGA), or an application-specific integrated circuit (ASIC) that is configured to receive UL/DL configuration information from a base station or a UE and send a signal to a switch. The TDD switch controller can be configured to switch between a DL configuration and an UL configuration in a 1 ms subframe basis for 3GPP LTE. The TDD switch controller can be configured to switch between a DL configuration and an UL configuration on a symbol basis for 3GPP 5G, wherein the duration of a symbol can vary based on numerology, such as the subcarrier spacing or cyclic prefix.

Figure 7:
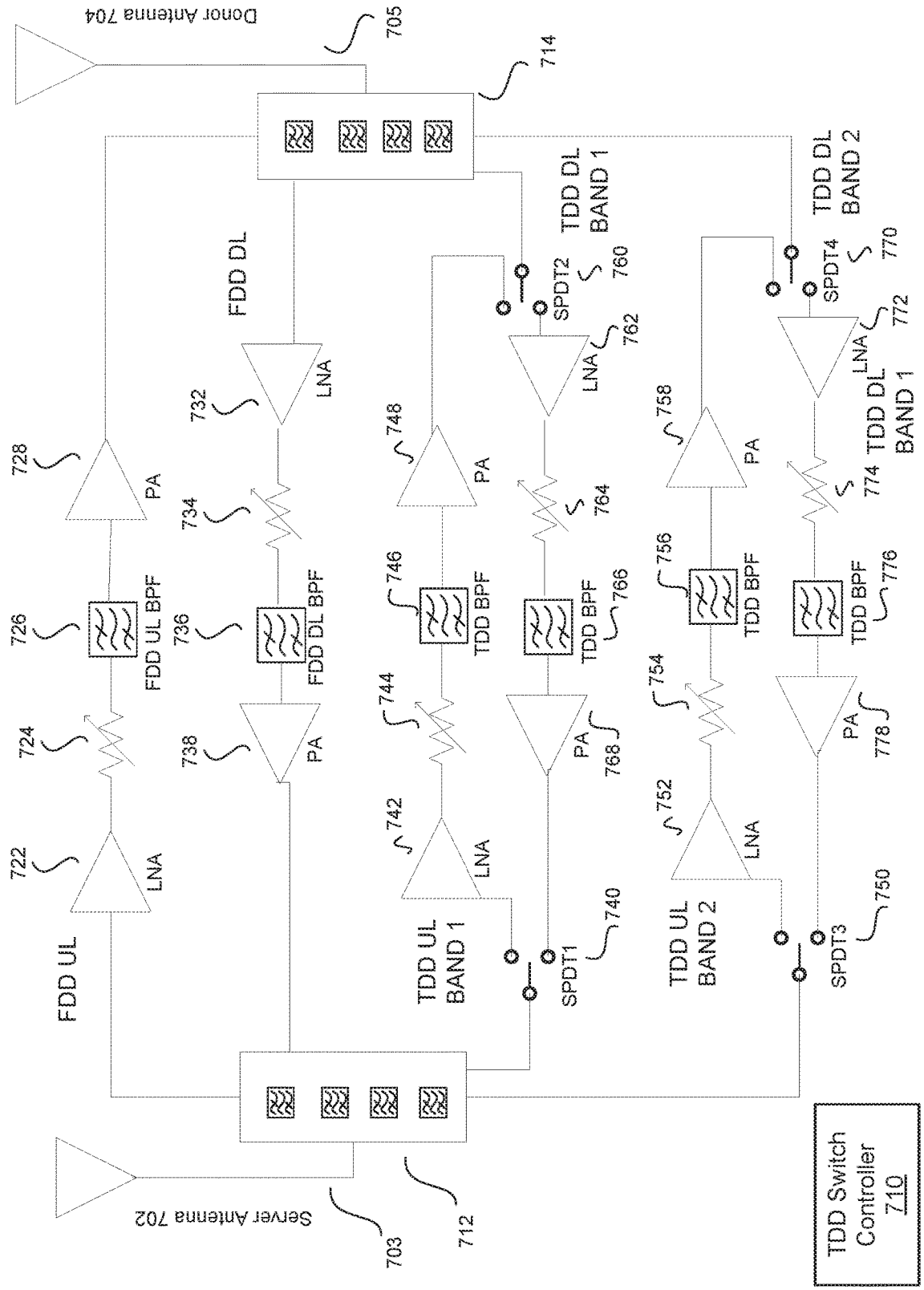
FIG. 7 illustrates a frequency division duplex (FDD)/time division duplex (TDD) integrated repeater with multiband TDD in accordance with an example.

As illustrated in FIG. 7, in another example, a repeater can be a frequency division duplex (FDD)/time division duplex (TDD) integrated repeater. The repeater can be configured to be connected to a server antenna 702 and a donor antenna 704. The server antenna 702 can receive an uplink signal from a wireless device. The server antenna 702 can be configured to be coupled to a server antenna port 703. The server antenna port 703 can be coupled to a multiplexer 712. The uplink signal received at the server antenna 702 from the wireless device can be directed to multiplexer 712. The multiplexer 712 can direct the FDD uplink signal, based on its frequency, to an FDD uplink path.

In another example, the FDD uplink signal can travel along the FDD uplink path. The FDD UL path can comprise one or more of a low-noise amplifier (LNA) 722, a variable attenuator 724, an FDD UL band-pass filter (BPF) 726, or a power amplifier 728. In another example, the power amplifier 728 can comprise a variable gain power amplifier, a fixed gain power amplifier, or a gain block. In another example, the FDD UL BPF 726 can be configured to communicate one or more of 3GPP FDD frequency bands 2, 4, 5, 12, 13, 17, 25, 26, or 71. In another example, the FDD UL BPF 726 can be configured to communicate one or more of 3GPP FDD frequency bands 1-28, 30, 31, 65, 66, 68, 70-74, or 85. In another example, the FDD UL BPF 726 can be configured to communicate a selected channel within a 3GPP FDD band. After traveling along the FDD uplink path, the FDD uplink signal can be amplified and filtered in accordance with the type of amplifiers and BPFs included along the FDD uplink path. At this point, the FDD uplink signal can be directed to the multiplexer 714. The multiplexer 714 can be coupled to a donor antenna port 705. The FDD uplink signal can be directed from the multiplexer 714 to the donor antenna port 705. The FDD uplink signal can be directed from the donor antenna port 705 to the donor antenna 704. The donor antenna 704 can communicate the amplified and/or filtered FDD uplink signal to a base station.

In another example, the donor antenna 704 can receive a downlink signal from a base station. The donor antenna 704 can be coupled to a donor antenna port 705. The donor antenna port 705 can be coupled to a multiplexer 714. The downlink signal received at the donor antenna 704 from the base station can be directed to multiplexer 714. The multiplexer 714 can direct the FDD downlink signal, based on its frequency, to an FDD downlink path.

In another example, the FDD downlink signal can travel along the FDD downlink path. The FDD DL path can comprise one or more of a low-noise amplifier (LNA) 732, a variable attenuator 734, an FDD DL band-pass filter (BPF) 736, or a power amplifier 738. In another example, the power amplifier 738 can comprise a variable gain power amplifier, a fixed gain power amplifier, or a gain block. In another example, the FDD DL BPF 736 can be configured to communicate one or more of 3GPP FDD frequency bands 2, 4, 5, 12, 13, 17, 25, 26, or 71. In another example, the FDD DL BPF 736 can be configured to communicate one or more of 3GPP FDD frequency bands 1-28, 30, 31, 65, 66, 68, 70-74, or 85. In another example, the FDD DL BPF 736 can be configured to communicate a selected channel within a 3GPP FDD band. After traveling along the FDD downlink path, the FDD downlink signal can be amplified and filtered in accordance with the type of amplifiers and BPFs included along the FDD downlink path. At this point, the FDD downlink signal can be directed to the multiplexer 712. The multiplexer 712 can be coupled to a server antenna port 703. The FDD downlink signal can be directed from the multiplexer 712 to the server antenna port 703. The FDD downlink signal can be directed from the server antenna port 703 to the server antenna 702. The server antenna 702 can communicate the amplified and/or filtered FDD downlink signal to a wireless device.

In another example, the server antenna 702 can receive an uplink signal from a wireless device. The server antenna 702 can be coupled to a server antenna port 703. The server antenna port 703 can be coupled to a multiplexer 712. The uplink signal received at the server antenna 702 from the wireless device can be directed to multiplexer 712. The multiplexer 712 can direct the TDD uplink signal, based on its frequency, to a single pole double throw (SPDT) switch 740.

In another example, the SPDT switch 740 can direct the TDD uplink signal to the TDD uplink path. The TDD UL path can comprise one or more of a low-noise amplifier (LNA) 742, a variable attenuator 744, a TDD band-pass filter (BPF) 746, or a power amplifier 748. In another example, the power amplifier 748 can comprise a variable gain power amplifier, a fixed gain power amplifier, or a gain block. In another example, the TDD BPF 746 can be configured to communicate one or more of 3GPP TDD frequency bands 41, 48, or 49. In another example, the TDD BPF 746 can be configured to communicate one or more of 3GPP TDD frequency bands 33 through 52. In another example, the TDD BPF 746 can be configured to communicate a selected channel within a 3GPP TDD band. After traveling along the TDD uplink path, the TDD uplink signal can be amplified and filtered in accordance with the type of amplifiers and BPFs included along the TDD uplink path. At this point, the TDD uplink signal can be directed to a single pole double throw (SPDT) switch 760. The SPDT switch 760 can direct the TDD uplink signal to a multiplexer 714. The multiplexer 714 can be coupled to a donor antenna port 705. The TDD uplink signal can be directed from the multiplexer 714 to the donor antenna port 705. The TDD uplink signal can be directed from the donor antenna port 705 to the donor antenna 704. The donor antenna 704 can communicate the amplified and/or filtered TDD uplink signal to a base station.

In another example, the donor antenna 704 can receive a downlink signal from a base station. The donor port 705 can be configured to be coupled to a donor antenna 704. The donor antenna port 705 can be coupled to a multiplexer 714. The downlink signal received at the donor antenna 704 from the base station can be directed to multiplexer 714. The multiplexer 714 can direct the TDD downlink signal, based on its frequency, to a single pole double throw (SPDT) switch 760.

In another example, the TDD downlink signal can travel along the TDD downlink path. The TDD DL path can comprise one or more of a low-noise amplifier (LNA) 762, a variable attenuator 764, a TDD band-pass filter (BPF) 766, or a power amplifier 768. In another example, the power amplifier 768 can comprise a variable gain power amplifier, a fixed gain power amplifier, or a gain block. In another example, the TDD BPF 766 can be configured to communicate one or more of 3GPP TDD frequency bands 41, 48, or 49. In another example, the TDD BPF 766 can be configured to communicate one or more of 3GPP TDD frequency bands 33 through 52. In another example, the TDD BPF 766 can be configured to communicate a selected channel within a 3GPP TDD band. After traveling along the TDD downlink path, the TDD downlink signal can be amplified and filtered in accordance with the type of amplifiers and BPFs included along the TDD downlink path. At this point, the TDD downlink signal can be directed to the SPDT switch 740. The SPDT switch 740 can direct the amplified and/or filtered TDD downlink signal to the multiplexer 712. The multiplexer 712 can be coupled to a server antenna port 703. The TDD downlink signal can be directed from the multiplexer 712 to the server antenna port 703. The TDD downlink signal can be directed from the server antenna port 703 to the server antenna 702. The server antenna 702 can communicate the amplified and/or filtered TDD downlink signal to a wireless device.

In another example, a repeater can further comprise a TDD switch controller 710. The TDD switch controller can be configured to receive UL/DL configuration information from a base station or UE, as previously discussed. Alternatively, the UL/DL configuration information may be received at a different location within the repeater and communicated to the TDD switch controller 710. The repeater can be configured to switch the SPDT switch 740 to pass a first-direction or uplink TDD signal from the server antenna port 703 to the TDD UL path and switch the SPDT switch 760 to pass the first-direction or uplink TDD signal to the donor antenna port 705. In another example, the repeater can be configured to switch the SPDT switch 760 to pass a second-direction or downlink TDD signal from the donor antenna port 705 to the TDD DL path and switch the SPDT switch 740 to pass the second-direction or downlink TDD signal to the server antenna port 703.

In another example, the repeater can be configured to switch the SPDT switch 740 to pass a first-direction or uplink TDD signal from the server antenna port 703 to the TDD UL path and switch the SPDT switch 760 to pass a second-direction or downlink TDD signal from the donor antenna port 705 to the TDD DL path. In another example, the repeater can be configured to switch the SPDT switch 760 to pass a second-direction or downlink TDD signal from the donor antenna port 705 to the TDD DL path and switch the SPDT switch 740 to pass the second-direction or downlink TDD signal to the first antenna port.

In another example, the TDD switch controller 710 can comprise one or more of a modem, a field-programmable gate array (FPGA), or an application-specific integrated circuit (ASIC) that is configured to receive UL/DL configuration information from a base station or a UE and send a signal to a switch. The TDD switch controller can be configured to switch between a DL configuration and an UL configuration in a 1 ms subframe basis for 3GPP LTE. The TDD switch controller can be configured to switch between a DL configuration and an UL configuration on a symbol basis for 3GPP 5G, wherein the duration of a symbol can vary based on numerology, such as the subcarrier spacing or cyclic prefix.

In another example, the server antenna 702 can receive an uplink signal from a wireless device. The server antenna 702 can be coupled to a server antenna port 703. The server antenna port 703 can be coupled to a multiplexer 712. The uplink signal received at the server antenna 702 from the wireless device can be directed to multiplexer 712. The multiplexer 712 can direct the TDD uplink signal, based on its frequency, to a single pole double throw (SPDT) switch 750.

In another example, the SPDT switch 750 can direct the TDD uplink signal to the TDD uplink path. The TDD UL path can comprise one or more of a low-noise amplifier (LNA) 752, a variable attenuator 754, a TDD band-pass filter (BPF) 756, or a power amplifier 758. In another example, the power amplifier 758 can comprise a variable gain power amplifier, a fixed gain power amplifier, or a gain block. In another example, the TDD BPF 756 can be configured to communicate one or more of 3GPP TDD frequency bands 41, 48, or 49. In another example, the TDD BPF 756 can be configured to communicate one or more of 3GPP TDD frequency bands 33 through 52. In another example, the TDD BPF 756 can be configured to communicate a selected channel within a 3GPP TDD band. In another example, the frequency range passed by TDD BPF 756 can be a different band, a different channel, or a different frequency range from the band, channel, or frequency range passed by TDD BPF 746. After traveling along the TDD uplink path, the TDD uplink signal can be amplified and filtered in accordance with the type of amplifiers and BPFs included along the TDD uplink path. At this point, the TDD uplink signal can be directed to a single pole double throw (SPDT) switch 770. The SPDT switch 770 can direct the TDD uplink signal to a multiplexer 714. The multiplexer 714 can be coupled to a donor antenna port 705. The TDD uplink signal can be directed from the multiplexer 714 to the donor antenna port 705. The TDD uplink signal can be directed from the donor antenna port 705 to the donor antenna 704. The donor antenna 704 can communicate the amplified and/or filtered TDD uplink signal to a base station.

In another example, the donor antenna 704 can receive a downlink signal from a base station. The donor antenna 704 can be coupled to a donor antenna port 705. The donor antenna port 705 can be coupled to a multiplexer 714. The downlink signal received at the donor antenna 704 from the base station can be directed to multiplexer 714. The multiplexer 714 can direct the TDD downlink signal, based on its frequency, to a single pole double throw (SPDT) switch 770.

In another example, the TDD downlink signal can travel along the TDD downlink path. The TDD DL path can comprise one or more of a low-noise amplifier (LNA) 772, a variable attenuator 774, a TDD band-pass filter (BPF) 776, or a power amplifier 778. In another example, the power amplifier 778 can comprise a variable gain power amplifier, a fixed gain power amplifier, or a gain block. In another example, the TDD BPF 776 can be configured to communicate one or more of 3GPP TDD frequency bands 41, 48, or 49. In another example, the TDD BPF 776 can be configured to communicate one or more of 3GPP TDD frequency bands 33 through 52. In another example, the TDD BPF 776 can be configured to communicate a selected channel within a 3GPP TDD band. In another example, the frequency range passed by TDD BPF 776 can be a different band, a different channel, or a different frequency range from the band, channel, or frequency range passed by TDD BPF 766. After traveling along the TDD downlink path, the TDD downlink signal can be amplified and filtered in accordance with the type of amplifiers and BPFs included along the TDD downlink path. At this point, the TDD downlink signal can be directed to the SPDT switch 750. The SPDT switch 750 can direct the amplified and/or filtered TDD downlink signal to the multiplexer 712. The multiplexer 712 can be coupled to a server antenna port 703. The TDD downlink signal can be directed from the multiplexer 712 to the server antenna port 703. The TDD downlink signal can be directed from the server antenna port 703 to the server antenna 702. The server antenna 702 can communicate the amplified and/or filtered TDD downlink signal to a wireless device.

In another example, a repeater can further comprise a TDD switch controller 710. The TDD switch controller can be configured to receive UL/DL configuration information from a base station or UE, as previously discussed. Alternatively, the UL/DL configuration information may be received at a different location within the repeater and communicated to the TDD switch controller 710. The repeater can be configured to switch the SPDT switch 750 to pass a first-direction or uplink TDD signal from the server antenna port 703 to the TDD UL path and switch the SPDT switch 770 to pass the first-direction or uplink TDD signal to the donor antenna port 705. In another example, the repeater can be configured to switch the SPDT switch 770 to pass a second-direction or downlink TDD signal from the donor antenna port 705 to the TDD DL path and switch the SPDT switch 750 to pass the second-direction or downlink TDD signal to the server antenna port 703.

In another example, the repeater can be configured to switch the SPDT switch 750 to pass a first-direction or uplink TDD signal from the server antenna port 703 to the TDD UL path and switch the SPDT switch 770 to pass a second-direction or downlink TDD signal from the donor antenna port 705 to the TDD DL path. In another example, the repeater can be configured to switch the SPDT switch 770 to pass a second-direction or downlink TDD signal from the donor antenna port 705 to the TDD DL path and switch the SPDT switch 750 to pass the second-direction or downlink TDD signal to the first antenna port.

In another example, the TDD switch controller 710 can comprise one or more of a modem, a field-programmable gate array (FPGA), or an application-specific integrated circuit (ASIC) that is configured to receive UL/DL configuration information from a base station or a UE and send a signal to a switch. The TDD switch controller can be configured to switch between a DL configuration and an UL configuration in a 1 ms subframe basis for 3GPP LTE. The TDD switch controller can be configured to switch between a DL configuration and an UL configuration on a symbol basis for 3GPP 5G, wherein the duration of a symbol can vary based on numerology, such as the subcarrier spacing or cyclic prefix.

In another example, a repeater can be configured to receive an access level indicator from one or more of a base station or a user equipment (UE). The repeater can be further configured to identify an access level based on the access level indicator. The repeater can be further configured to activate a repeater when the access level permits repeater access; or deactivate the repeater when the access level prohibits repeater access. The repeater can be further configured to receive the access level indicator from the base station or the UE using one or more of a modem, a field-programmable gate array (FPGA), or an application-specific integrated circuit (ASIC). The repeater can be further configured to receive the access level indicator from the UE using a Bluetooth connection.

In another example, a repeater can be configured to receive the access level indicator from a base station or user equipment via higher layer signaling, such as radio resource control (RRC) signaling. In another example, for each radio frame, the repeater can demodulate and/or decode control information in a physical downlink control channel (PDCCH) or physical downlink shared channel (PDSCH) using a downlink control information (DCI) format type to receive the access level indicator.

In another example, a repeater can be configured to identify a location of the repeater by receiving the location of a UE via a Bluetooth connection with the UE and inferring the location of the repeater based on the location of the UE. In another example, a repeater can be configured to identify a location of the repeater by receiving the location of a UE via a WiFi connection with the UE and inferring the location of the repeater based on the location of the UE. In another example, a repeater can be configured to identify a location of the repeater by using a satellite location system receiver such as a global positioning system (GPS) receiver, a Global Navigation Satellite System (GLONASS) receiver, a Galileo positioning system receiver, a BeiDou Navigation Satellite System receiver, a Navigation with Indian Constellation (NAVIC) receiver, or a Quasi-Zenith Satellite System (QZSS) receiver. In another example, a repeater can be configured to identify a location of the repeater using a lookup table stored on the repeater. In another example, the repeater can identify a location of the repeater from a base station identifier received from the base station and inferring the location of the repeater based on the location of the base station.

In another example, the repeater can determine an access level based on the location of the repeater. The repeater can be further configured to activate a repeater when the access level permits repeater access; or deactivate the repeater when the access level prohibits repeater access.

In another example, the repeater can be configured to activate the repeater by one or more of: switch a first switch to pass a first-direction TDD signal from a first antenna port to a TDD first direction amplification and filtering path and switch a second switch to pass the first-direction TDD signal to a second antenna port; or switch a second switch to pass a second-direction TDD signal from a second antenna port to a TDD second direction amplification and filtering path and switch a first switch to pass the second-direction TDD signal to a first antenna port.

In another example, the repeater can be configured to deactivate the repeater by one or more of: switch a first switch to pass a first-direction TDD signal from a first antenna port to a TDD first direction amplification and filtering path and switch a second switch to pass a second-direction TDD signal from a second antenna port to a TDD second direction amplification and filtering path; or switch a second switch to pass a second-direction TDD signal from a second antenna port to a TDD second direction amplification and filtering path and switch a first switch to pass the second-direction TDD signal to a first antenna port.

Figure 8:
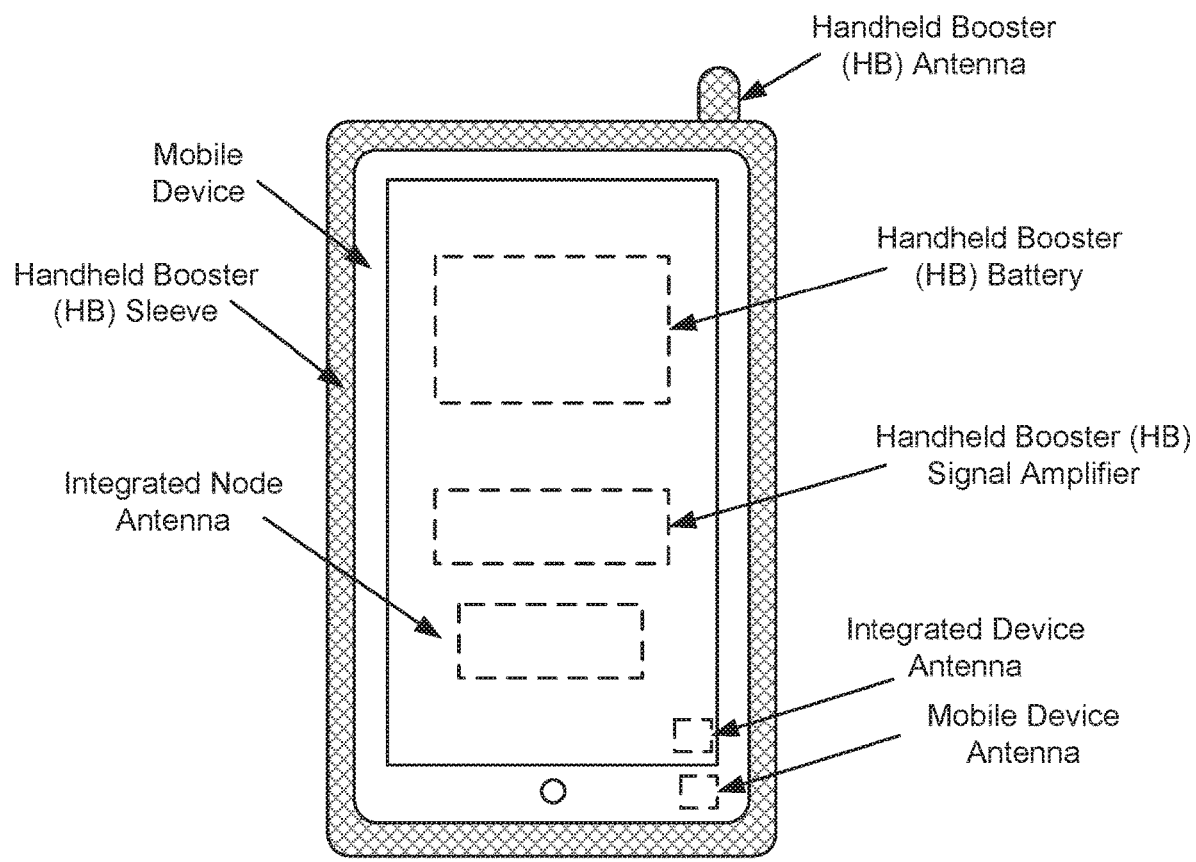
FIG. 8 illustrates a handheld booster in communication with a wireless device in accordance with an example.

While various embodiments described herein, and illustrated in FIGS. 1-7, have been described with respect to a cellular signal amplifier with a donor antenna and a server antenna, this is not intended to be limiting. An FDD/TDD integrated repeater can also be accomplished using a handheld booster, as illustrated in FIG. 8. The handheld booster can include an integrated device antenna and an integrated node antenna that are typically used in place of the indoor antenna and outdoor antenna, respectively.

Figure 9:
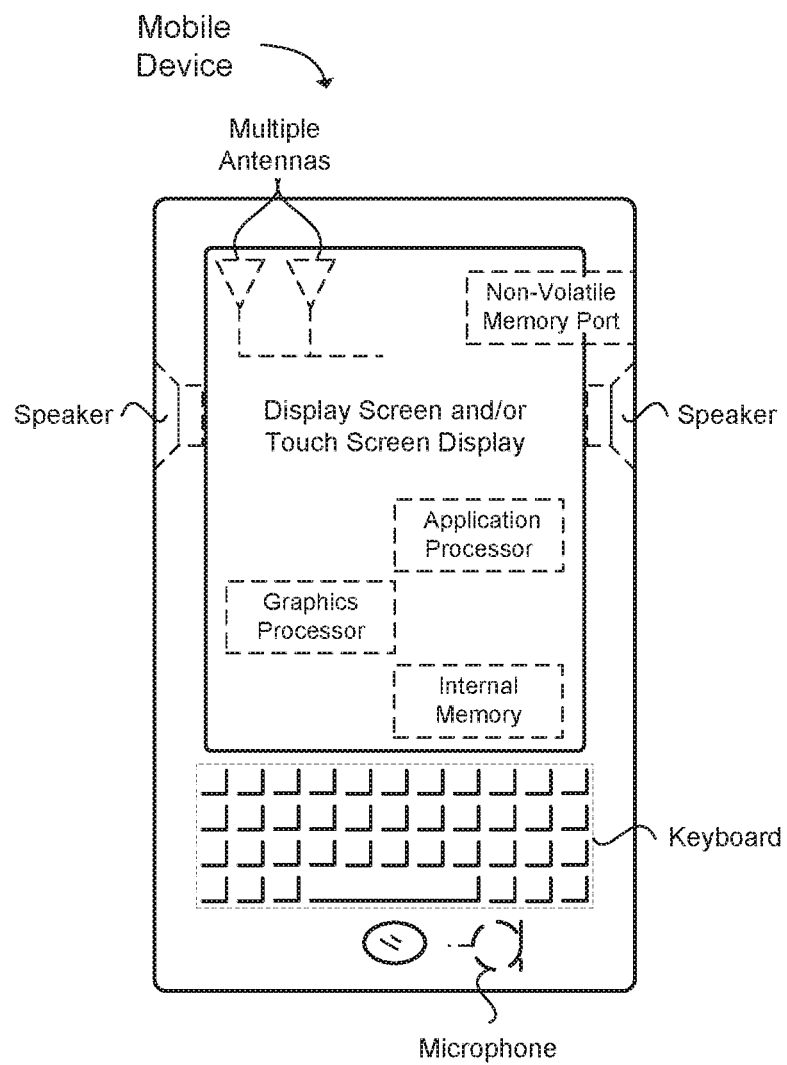
FIG. 9 illustrates a user equipment (UE) in accordance with an example.

FIG. 9 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 9 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Figure 10:
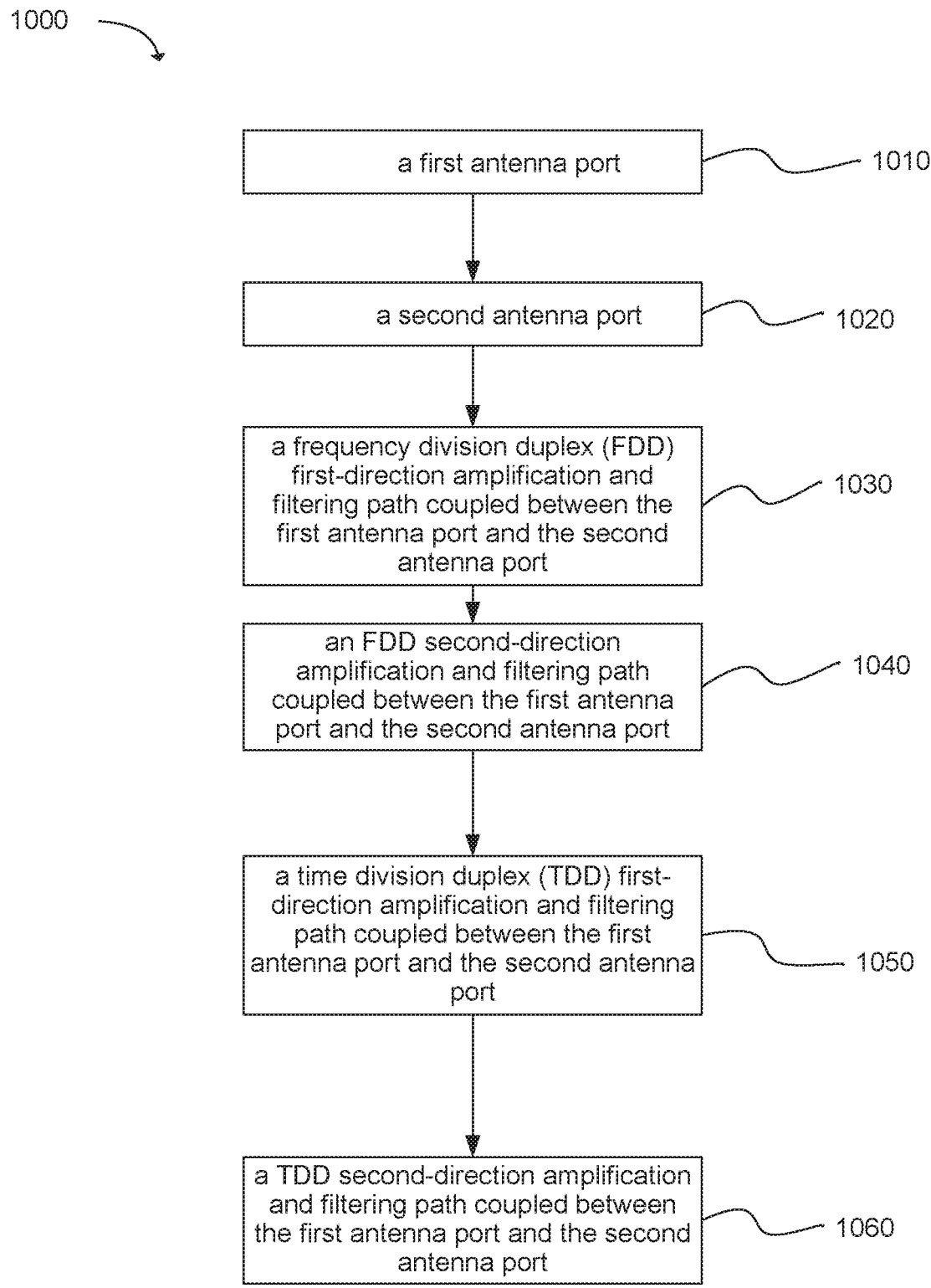
FIG. 10 depicts a repeater in accordance with an example.

Another example provides a repeater 1000, as shown in the flow chart in FIG. 10. The repeater can comprise a first antenna port, as shown in block 1010. The repeater can further comprise a second antenna port, as shown in block 1020. The repeater can further comprise a frequency division duplex (FDD) first-direction amplification and filtering path coupled between the first antenna port and the second antenna port, as shown in block 1030. The repeater can further comprise an FDD second-direction amplification and filtering path coupled between the first antenna port and the second antenna port, as shown in block 1040. The repeater can further comprise a time division duplex (TDD) first-direction amplification and filtering path coupled between the first antenna port and the second antenna port, as shown in block 1050. The repeater can further comprise a TDD second-direction amplification and filtering path coupled between the first antenna port and the second antenna port, as shown in block 1060.

Figure 11:
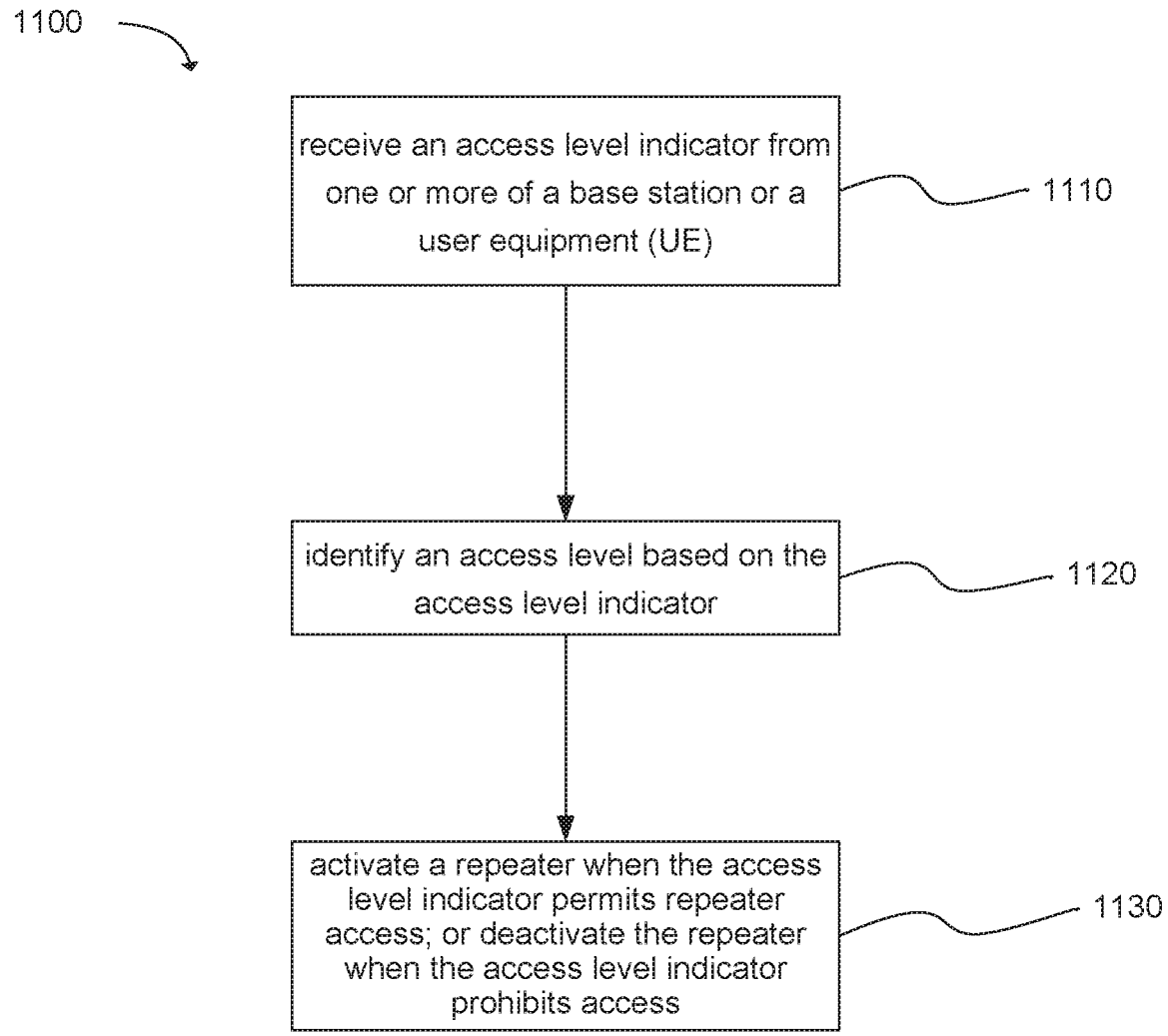
FIG. 11 depicts a repeater in accordance with an example.
Figure 12:
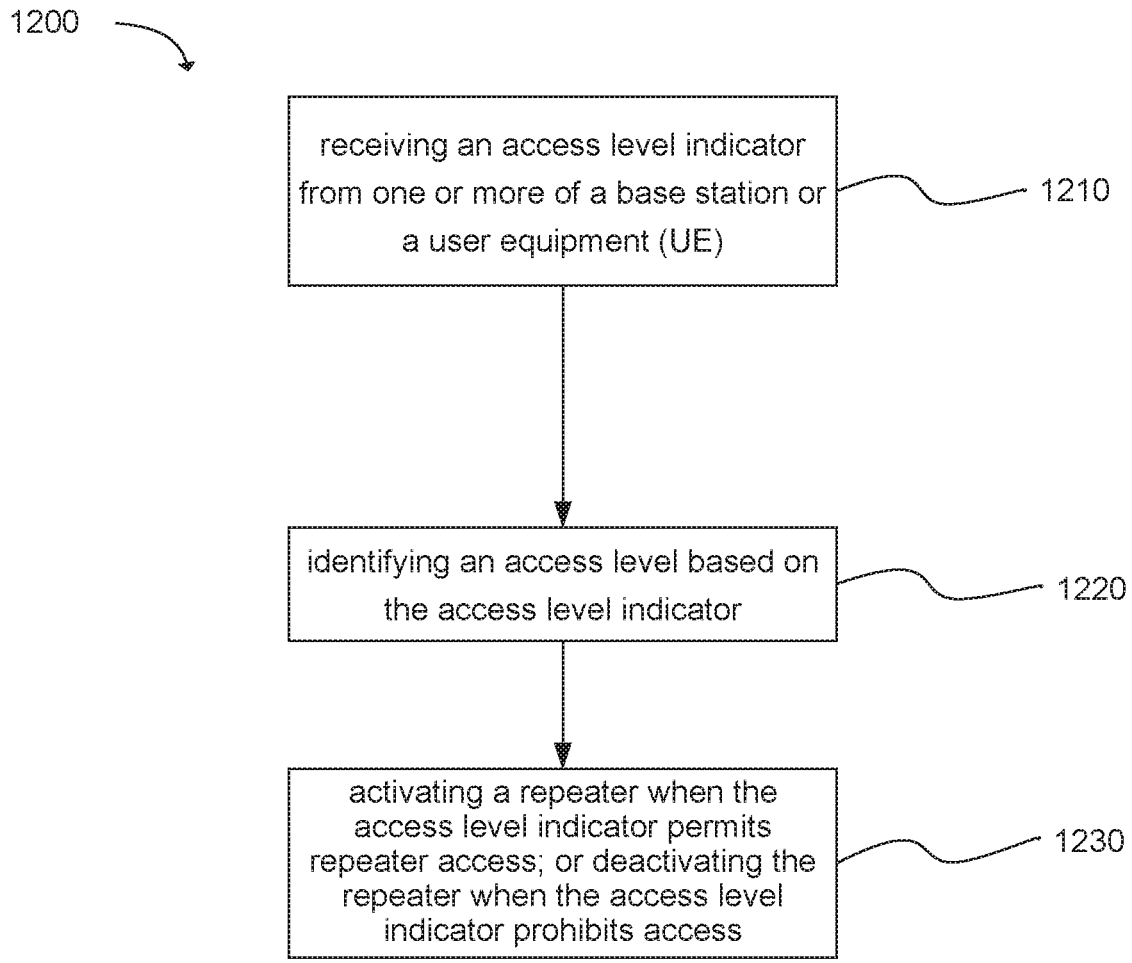
FIG. 12 depicts a flow chart of a machine readable medium having instructions embodied thereon for controlling a repeater in accordance with an example.

Another example provides a repeater 1100, as shown in the flow chart in FIG. 11. The repeater can be configured to receive an access level indicator from one or more of a base station or a user equipment (UE), as shown in block 1110. The repeater can be further configured to identify an access level based on the access level indicator, as shown in block 1120. The repeater can be further configured to activate the repeater when the access level permits repeater access; or deactivate the repeater when the access level prohibits repeater access, as shown in block 1130.

Another example provides at least one machine readable storage medium having instructions 1200 embodied thereon for controlling a repeater. The instructions can be executed on a machine, where the instructions are included on at least one computer readable medium or one non-transitory machine readable storage medium. The instructions when executed perform: receiving an access level indicator from one or more of a base station or a user equipment (UE), as shown in block 1210. The instructions when executed perform: identifying an access level based on the access level indicator, as shown in block 1220. The instructions when executed perform: activating the repeater when the access level permits repeater access; or deactivating the repeater when the access level prohibits repeater access, as shown in block 1230.

In another example, a citizens broadband radio service TDD architecture can include one or more uplink or downlink amplification and filtering paths configured to amplify and/or filter 3GPP frequency bands including 3GPP long term evolution (LTE) frequency bands 48 or 49. As previously discussed, an integrated circuit (IC) (e.g., one or more or a modem, a reduced-functionality modem, an FPGA, or an ASIC) can be configured to indicate to a repeater whether to transmit or receive in a provided time interval.

Figure 13:
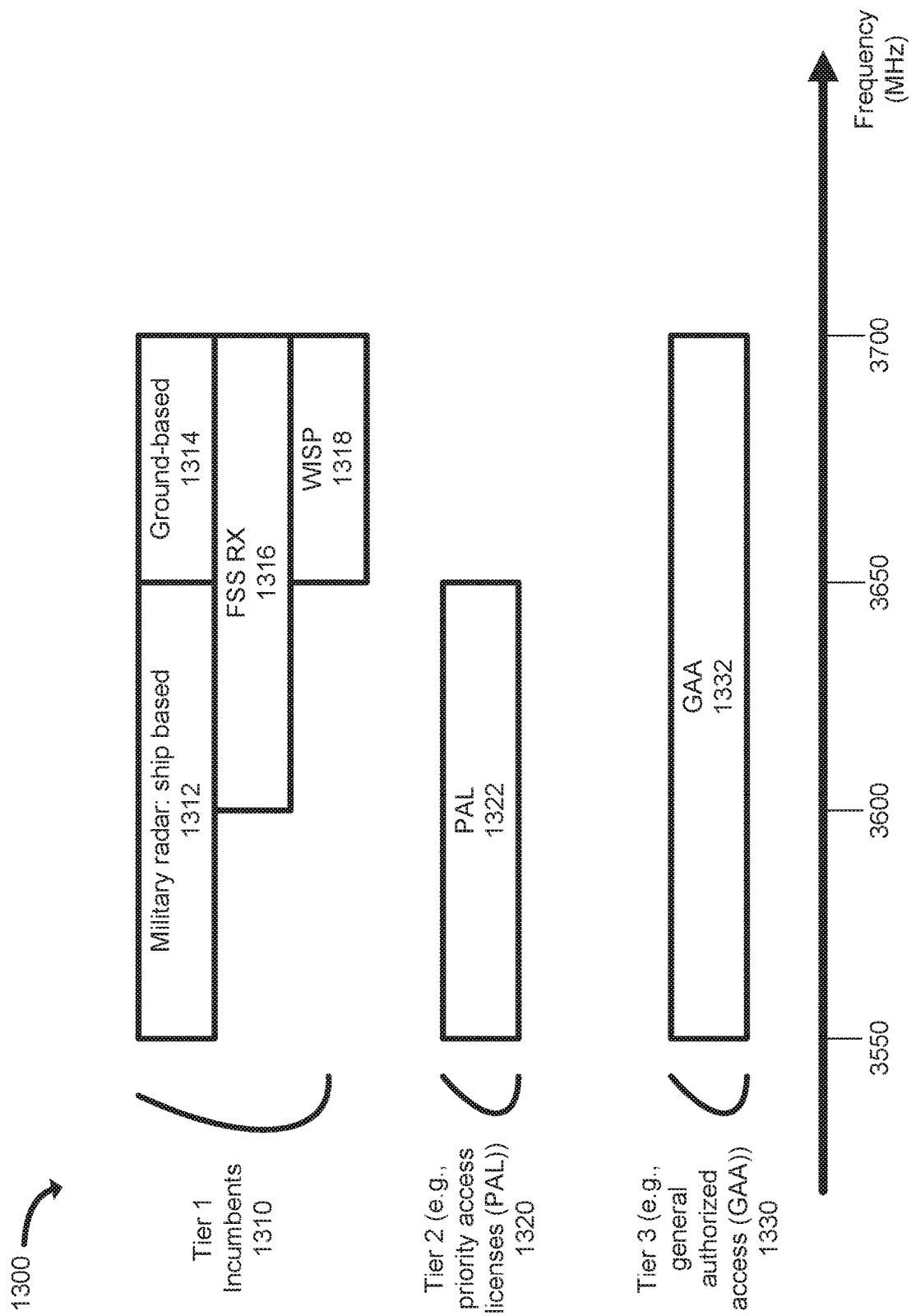
FIG. 13 illustrates three-tiered spectrum sharing in accordance with an example.

In another example, as illustrated in FIG. 13, spectrum sharing 1300 can include three tiers of access. Frequency assignment for a CSRS-configured repeater can be based on a spectrum access system (SAS). In one example, the repeater can receive an access level indicator from the SAS for a selected contested frequency band. A frequency band can be contested when a device with a higher priority level than the repeater can be configured to operate on the frequency band. The repeater can identify one or more sub-bands available to the repeater in the selected contested frequency band based on the access level indicator. The repeater can be configured to activate the repeater for the one or more sub-bands when the access level permits repeater access. The repeater can deactivate the repeater for one or more sub-bands that are prohibited based on the access level.

In another example, the repeater can be configured to communicate with the SAS via one or more of a wired connection or a wireless connection. The repeater can be configured to transmit at a low-power-level over one or more sub-bands that are prohibited based on the access level indicator. In one example, the low-power level can be below a power threshold to avoid interference with a higher priority device. The repeater can be configured to switch from the low-power level to a high-power level when the one or more prohibited sub-bands become available. In one example, the high-power level can be above a power threshold that can interfere with a higher-priority device in operation.

In another example, the access level indicator can be received at the repeater from the SAS via one or more of a cloud-computing environment, a user equipment (UE), a base station (BS), or a modem. The modem can be one or more or a modem, a reduced-functionality modem, an FPGA, or an ASIC.

In another example, a repeater can be configured to select the one or more sub-bands using a tunable filter. The tunable filter can include one or more digital filters. In another example, the repeater can be configured to select the one or more sub-bands using a switchable filter. The switchable filter can include one or more analog filters. In another example, the repeater can be configured to dynamically select the one or more sub-bands using the tunable filter, wherein the tunable filter is a channelized intermediate frequency (IF) or radio frequency (RF) filter.

In another example, the one or more sub-bands can be selected from a subset of one or more of: third generation partnership project (3GPP) long term evolution (LTE) TDD frequency band 41, 48, or 49; or 3GPP LTE TDD frequency bands 33 through 53, or 3GPP fifth generation (5G) TDD frequency bands n34, n38-n41, n48, n50-n51, n77-n79, n90, n257-n258, and n260-n261; or 3GPP LTE FDD frequency bands 2, 4, 5, 12, 13, 17, 25, 26, or 71; or 3GPP LTE FDD frequency bands 1-14, 17-28, 30-31, 65-66, 68, 70-74, 85, 87, or 88, or 3GPP 5G frequency bands n1-n3, n5, n7-n8, n12, n14, n18, n20, n25, n28, n30, n65-n66, n70-n71, or n74.

In another example, a first-priority tier can include incumbents 1310, such as military, which can be ship-based 1312 or ground-based 1314. The first-priority tier can include fixed satellite service receiving (FSS RX) 1316 or wireless internet service providers (WISPs) 1318.

In another example, a second tier of access can include a second-priority tier. The second-priority tier 1320 can include one or more priority access licenses (PALs) 1322. The second-priority tier can have a lower priority than the first-priority tier.

In another example, a third tier of access can include a third-priority tier. The third-priority tier 1330 can include one or more general authorized access (GAA) 1332 users. The third-priority tier can have a lower priority than the first-priority tier and the second-priority tier.

In another example, a repeater configured to be operable on frequency bands configured for spectrum sharing can be assumed to be a GAA user and may only repeat when authorized. In another example, a repeater configured to be operable on frequency bands configured for spectrum sharing can be assumed to have the tier level of the device that the repeater is configured to operate with and may only be authorized to repeat when the particular device is authorized.

As illustrated in FIG. 13, tier 1 incumbents 1310 can include ship-based military radar 1312 operable in a frequency range between 3550 MHz and 3650 MHz. Tier 1 incumbents 1310 can include ground-based military radar 1314 operable in a frequency range between 3650 MHz and 3700 MHz. Tier 1 incumbents 1310 can include FSS RX 1316 operable in a frequency range between 3600 MHz and 3700 MHz. Tier 1 incumbents 1310 can include WISP 1318 operable in a frequency range between 3650 MHz and 3700 MHz. Tier 2 licensees 1320 can include PALs 1322 operable in a frequency range between 3550 MHz and 3650 MHz. Tier 3 1330 can include GAAs 1332 operable in a frequency range between 3550 MHz and 3700 MHz.

In another example, a SAS can be a system that authorizes and manages use of spectrum for the Citizens Broadband Radio Service. The SAS can be configured to provide a grant to a CBRS enabled device via an interface. The SAS can be configured to interface to the CBRS enabled device via a domain proxy. A CBRS enabled device can include an idle state, a granted state, or an authorized state.

In another example, a CBRS enabled device (CBSD) can be configured to communicate with the SAS via one or more of: (a) registration, (b) spectrum inquiry, (c) grant request, (d) heartbeat requests, (e) relinquishing a grant, or (f) deregistration. Registration can include a CBSD providing information to the SAS and receiving a unique identifier from the SAS. Spectrum inquiry can include the CBSD receiving information about available spectrum based on the CBSD's location and the CBSD's installation properties. Grant requests can include a CBSD requesting a grant to reserve a portion of the spectrum for the CBSD's use. Upon approval, the CBSD can have a reservation without authorization to transmit using the grant. Heartbeat requests can include a CBSD periodically sending heartbeat requests for each of the CBSD's approved grants to receive authorization to transmit. Relinquishing a grant can include a CBSD relinquishing a grant when the CBSD no longer desires to transmit using a grant. Deregistration can include a CBSD deregistering from the SAS when the CBSD is decommissioned or moved.

Figure 14:
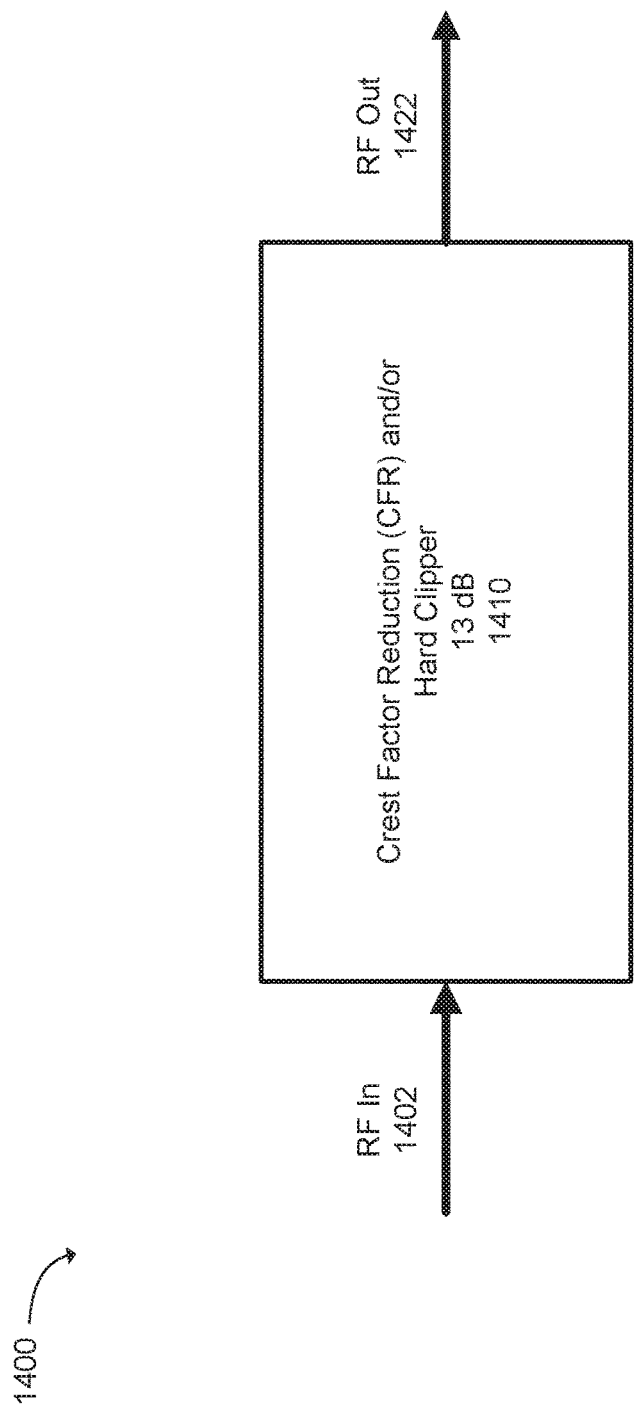
FIG. 14 illustrates time division duplex (TDD) architecture in accordance with an example.

In another example, as illustrated in FIG. 14 a repeater can include a block 1400 configured to adjust the peak-to-average power ratio (PAPR) of a transmitter output of the repeater to a permitted PAPR value based on a standard issued by a government or an industry-body. The block can include a radio frequency (RF) input 1402 and an RF output 1404. The standard can be 47 Code of Federal Regulations (CFR) section 96.41(g). The repeater can include one or more processors configured to adjust the PAPR using one or more of: hard clamping; or crest factor reduction (CFR). In another example, hard clipping or crest factor reduction can be applied at a baseband frequency. The one or more processors can be further configured to adjust the PAPR of the transmitter output of the repeater to a value of 13 decibels (dB).

Figure 15:
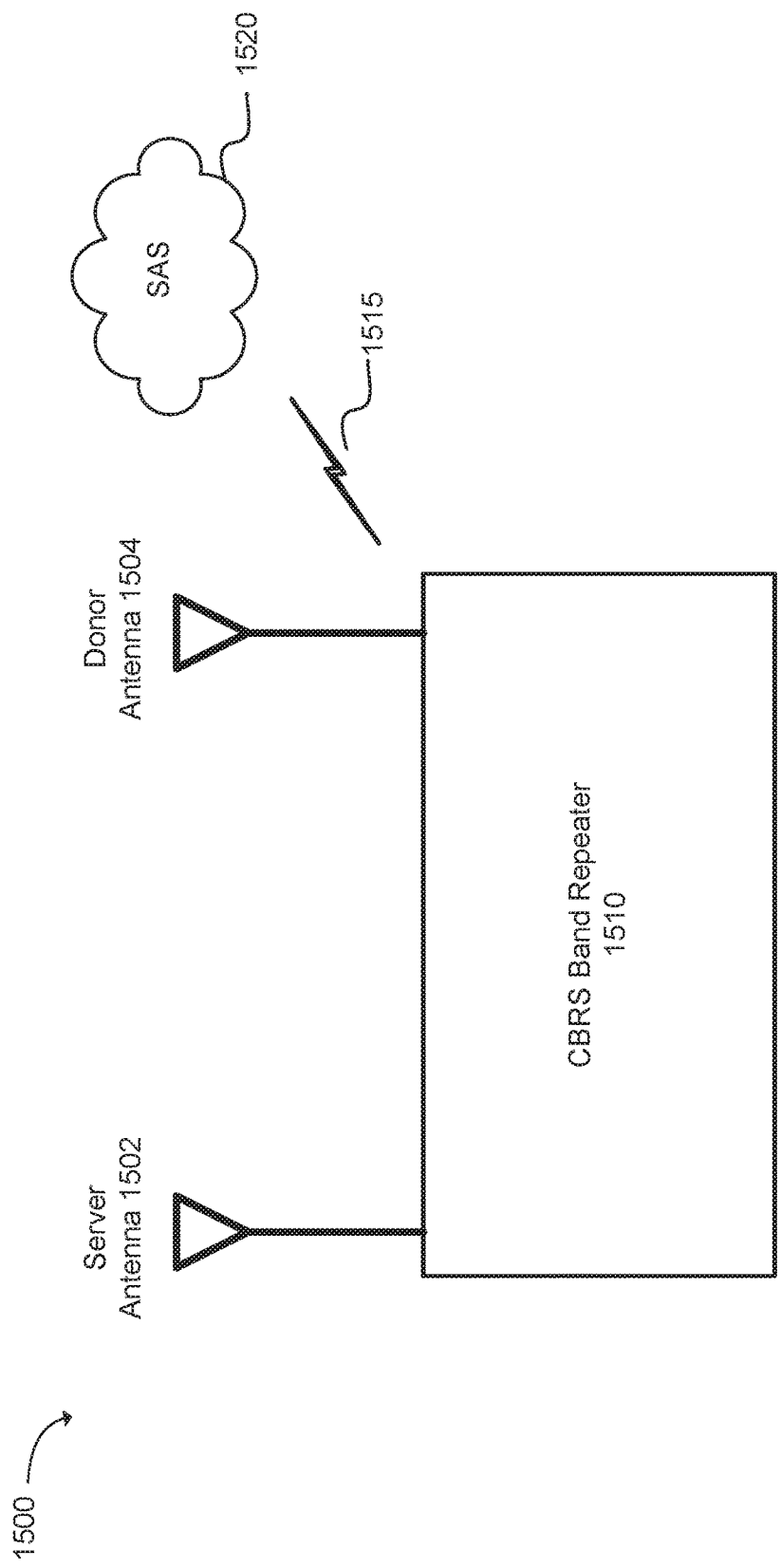
FIG. 15 illustrates a repeater configured to communicate with a spectrum access system (SAS) in accordance with an example.

In another example, as illustrated in FIG. 15, a repeater system 1500 can be configured to communicate with a spectrum access system (SAS) 1520. In this example, the repeater can be configured to communicate with a server antenna 1502 and a donor antenna 1504. The CBRS band repeater 1510 can be configured to communicate with the SAS via one or more of a wired or wireless connection 1515.

Figure 16:
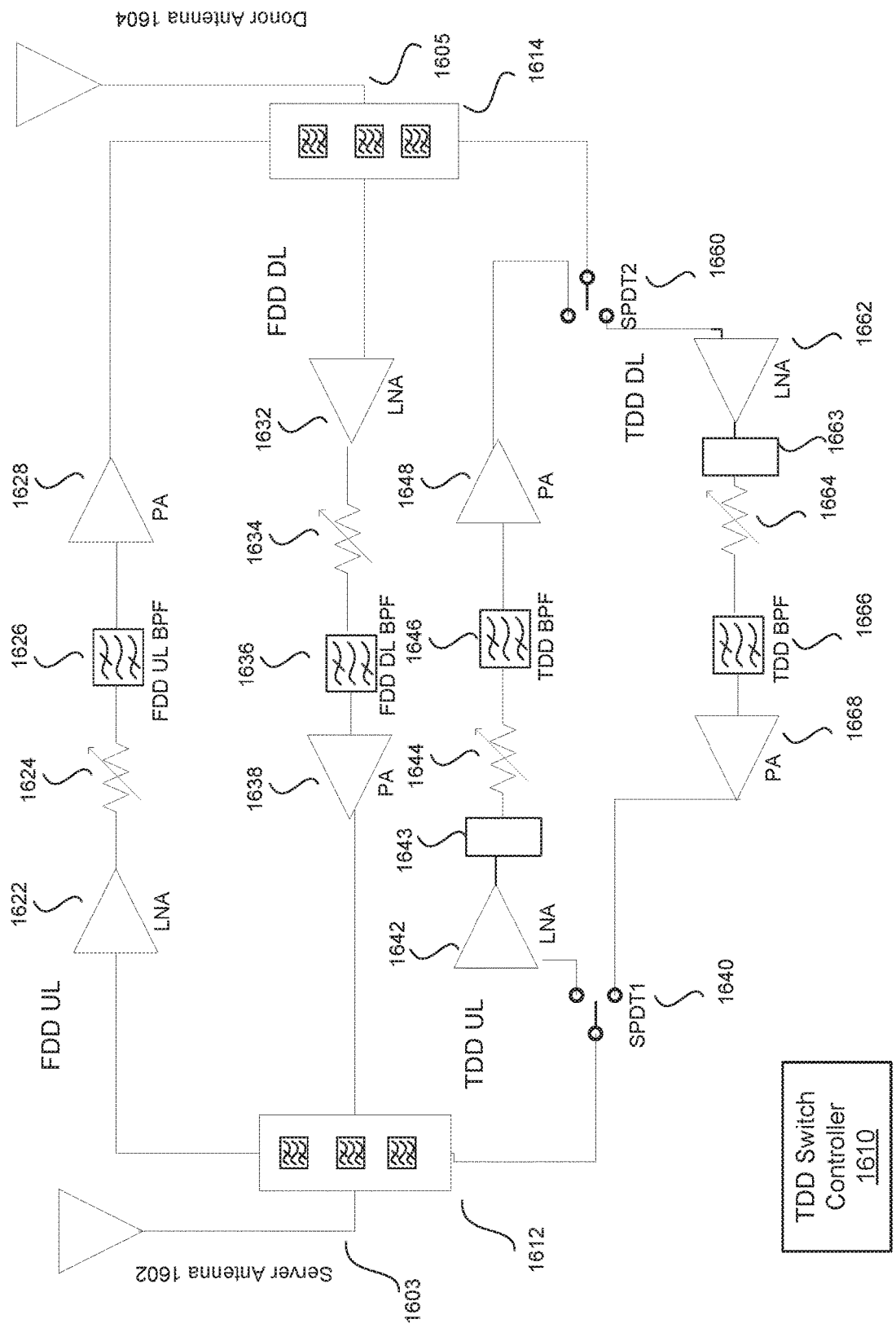
FIG. 16 illustrates a frequency division duplex (FDD)/time division duplex (TDD) integrated repeater in accordance with an example.

In another example, as illustrated in FIG. 16, a frequency division duplex (FDD)/time division duplex (TDD) integrated repeater can be configured to select the one or more sub-bands using one or more tunable filter (e.g., 1646 or 1666). The one or more tunable filters 1646 and 1666 can include one or more digital filters. In another example, the repeater can be configured to select the one or more sub-bands using a switchable filter. The switchable filter can include one or more analog filters. In another example, the repeater can be configured to dynamically select the one or more sub-bands using one or more tunable filters 1646 and 1666, wherein the one or more tunable filters 1646 and 1666 can be a channelized intermediate frequency (IF) or radio frequency (RF) filter.

In another example, one or more crest factor reduction blocks or hard clipping blocks 1643 can be configured to be connected between an LNA 1642 and an attenuator 1644. In another example, one or more crest factor reduction blocks or hard clipping blocks 1663 can be configured to be connected between an LNA 1662 and an attenuator 1664. The CFR or hard clipping blocks 1643 or 1663 can be configured to adjust the peak-to-average power ratio (PAPR) of a transmitter output of the repeater to a permitted PAPR value based on a standard issued by a government or an industry-body. The CFR or hard clipping blocks 1643 or 1663 can be configured to adjust the PAPR of the transmitter output of the repeater to a value of 13 decibels (dB).

In another example, the repeater can be configured to be coupled to a server antenna 1602 and a donor antenna 1604. The server antenna 1602 can receive an uplink signal from a wireless device. The server antenna 1602 can be configured to be coupled to a server antenna port 1603. The server antenna port 1603 can be coupled to a multiplexer 1612. The uplink signal directed to the server antenna port 1603 from the wireless device can be directed to multiplexer 1612. The multiplexer 1612 can direct the uplink signal, based on its frequency, to an FDD uplink path.

In another example, the FDD uplink signal can travel along the FDD uplink path. The FDD UL path can comprise one or more of a low-noise amplifier (LNA) 1622, a variable attenuator 1624, an FDD UL band-pass filter (BPF) 1626, or a power amplifier 1628. In another example, the power amplifier 1628 can comprise a variable gain power amplifier, a fixed gain power amplifier, or a gain block. In another example, the FDD UL BPF 1626 can be configured to communicate one or more of 3GPP FDD frequency bands 2, 4, 5, 12, 13, 17, 25, 26, or 71. In another example, the FDD UL BPF 1626 can be configured to communicate one or more of 3GPP FDD frequency bands 1-28, 30, 31, 65, 66, 68, 70-74, or 85. In another example, the FDD UL BPF 1626 can be configured to communicate a selected channel within a 3GPP FDD band. After traveling along the FDD uplink path, the FDD uplink signal can be amplified and filtered in accordance with the type of amplifiers and BPFs included along the FDD uplink path. At this point, the uplink signal can be directed to the multiplexer 1614. The multiplexer 1614 can be coupled to a donor antenna port 1605. The uplink signal can be directed from the multiplexer 1614 to the donor antenna port 1605. The uplink signal can be directed from the donor antenna port 1605 to the donor antenna 1604. The donor antenna 1604 can communicate the amplified and/or filtered uplink signal to a base station.

In another example, the donor antenna 1604 can receive a downlink signal from a base station. The donor antenna 1604 can be configured to be coupled to a donor antenna port 1605. The donor antenna port 1605 can be coupled to a multiplexer 1614. The downlink signal received at the donor antenna 1604 from the base station can be directed to multiplexer 1614. The multiplexer 1614 can direct the downlink signal, based on its frequency, to an FDD downlink path.

In another example, the FDD downlink signal can travel along the FDD downlink path. The FDD DL path can comprise one or more of a low-noise amplifier (LNA) 1632, a variable attenuator 1634, an FDD DL band-pass filter (BPF) 1636, or a power amplifier 1638. In another example, the power amplifier 1638 can comprise a variable gain power amplifier, a fixed gain power amplifier, or a gain block. In another example, the FDD DL BPF 1636 can be configured to communicate one or more of 3GPP FDD frequency bands 2, 4, 5, 12, 13, 17, 25, 26, or 71. In another example, the FDD DL BPF 1636 can be configured to communicate one or more of 3GPP FDD frequency bands 1-28, 30, 31, 65, 66, 68, 70-74, or 85. In another example, the FDD DL BPF 1636 can be configured to communicate a selected channel within a 3GPP FDD band. After traveling along the FDD downlink path, the FDD downlink signal can be amplified and filtered in accordance with the type of amplifiers and BPFs included along the FDD downlink path. At this point, the FDD downlink signal can be directed to the multiplexer 1612. The multiplexer 1612 can be coupled to a server antenna port 1603. The FDD downlink signal can be directed from the multiplexer 1612 to the server antenna port 1603. The FDD downlink signal can be directed from the server antenna port 1603 to the server antenna 1602. The server antenna 1602 can communicate the amplified and/or filtered FDD downlink signal to a wireless device.

In another example, the server antenna 1602 can receive an uplink signal from a wireless device. The server antenna 1602 can be coupled to a server antenna port 1603. The server antenna port 1603 can be coupled to a multiplexer 1612. The uplink signal received at the server antenna 1602 from the wireless device can be directed to multiplexer 1612. The multiplexer 1612 can direct the uplink signal, based on its frequency, to a single pole double throw (SPDT) switch 1640.

In another example, the SPDT switch 1640 can direct the TDD uplink signal to the TDD uplink path. The TDD UL path can comprise one or more of a low-noise amplifier (LNA) 1642, a CFR or hard clipping block 1643, or a variable attenuator 1644, a TDD band-pass filter (BPF) 1646, or a power amplifier 1648. In another example, the power amplifier 1648 can comprise a variable gain power amplifier, a fixed gain power amplifier, or a gain block. In another example, the TDD BPF 1646 can be configured to communicate one or more of 3GPP TDD frequency bands 41, 48, or 49. In another example, the TDD BPF 1646 can be configured to communicate one or more of 3GPP TDD frequency bands 33 through 52. In another example, the TDD BPF 1646 can be configured to communicate a selected channel within a 3GPP TDD band. After traveling along the TDD uplink path, the TDD uplink signal can be amplified and filtered in accordance with the type of amplifiers and BPFs included along the TDD uplink path. At this point, the TDD uplink signal can be directed to a single pole double throw (SPDT) switch 1660. The SPDT switch 1660 can direct the TDD uplink signal to a multiplexer 1614. The multiplexer 1614 can be coupled to a donor antenna port 1605. The TDD uplink signal can be directed from the multiplexer 1614 to the donor antenna port 1605. The TDD uplink signal can be directed from the donor antenna port 1605 to the donor antenna 1604. The donor antenna 1604 can communicate the amplified and/or filtered TDD uplink signal to a base station.

In another example, the donor antenna 1604 can receive a downlink signal from a base station. The donor antenna 1604 can be configured to be coupled to a donor antenna port 1605. The donor antenna port 1605 can be coupled to a multiplexer 1614. The downlink signal received at the donor antenna 1604 from the base station can be directed to multiplexer 1614. The multiplexer 1614 can direct the TDD downlink signal, based on its frequency, to a single pole double throw (SPDT) switch 1660.

In another example, the TDD downlink signal can travel along the TDD downlink path. The TDD DL path can comprise one or more of a low-noise amplifier (LNA) 1662, a CFR or hard clipping block 1663, a variable attenuator 1664, a TDD band-pass filter (BPF) 1666, or a power amplifier 1668. In another example, the power amplifier 1668 can comprise a variable gain power amplifier, a fixed gain power amplifier, or a gain block. In another example, the TDD BPF 1666 can be configured to communicate one or more of 3GPP TDD frequency bands 41, 48, or 49. In another example, the TDD BPF 1666 can be configured to communicate one or more of 3GPP TDD frequency bands 33 through 52. In another example, the TDD BPF 1666 can be configured to communicate a selected channel within a 3GPP TDD band. After traveling along the TDD downlink path, the TDD downlink signal can be amplified and filtered in accordance with the type of amplifiers and BPFs included along the TDD downlink path. At this point, the TDD downlink signal can be directed to the SPDT switch 1640. The SPDT switch 1640 can direct the amplified and/or filtered TDD downlink signal to the multiplexer 1612. The multiplexer 1612 can be coupled to a server antenna port 1603. The TDD downlink signal can be directed from the multiplexer 1612 to the server antenna port 1603. The TDD downlink signal can be directed from the server antenna port 1603 to the server antenna 1602. The server antenna 1602 can communicate the amplified and/or filtered TDD downlink signal to a wireless device.

In another example, a repeater can further comprise a TDD switch controller 1610. The TDD switch controller can be configured to receive UL/DL configuration information from a base station or UE, as previously discussed. Alternatively, the UL/DL configuration information may be received at a different location within the repeater and communicated to the TDD switch controller 1610. The repeater can be configured to switch the SPDT switch 1640 to pass a first-direction or uplink TDD signal from the server antenna port 1603 to the TDD UL path and switch the SPDT switch 1660 to pass the first-direction or uplink TDD signal to the donor antenna port 1605. In another example, the repeater can be configured to switch the SPDT switch 1660 to pass a second-direction or downlink TDD signal from the donor antenna port 1605 to the TDD DL path and switch the SPDT switch 1640 to pass the second-direction or downlink TDD signal to the server antenna port 1603.

In another example, the repeater can be configured to switch the SPDT switch 1640 to pass a first-direction or uplink TDD signal from the server antenna port 1603 to the TDD UL path and switch the SPDT switch 1660 to pass a second-direction or downlink TDD signal from the donor antenna port 1605 to the TDD DL path. In another example, the repeater can be configured to switch the SPDT switch 1660 to pass a second-direction or downlink TDD signal from the donor antenna port 1605 to the TDD DL path and switch the SPDT switch 1640 to pass the second-direction or downlink TDD signal to the first antenna port.

In another example, the TDD switch controller 1610 can comprise one or more of a modem, a field-programmable gate array (FPGA), or an application-specific integrated circuit (ASIC) that is configured to receive UL/DL configuration information from a base station or a UE and send a signal to a switch. The TDD switch controller can be configured to switch between a DL configuration and an UL configuration in a 1 ms subframe basis for 3GPP LTE. The TDD switch controller can be configured to switch between a DL configuration and an UL configuration on a symbol basis for 3GPP 5G, wherein the duration of a symbol can vary based on numerology, such as the subcarrier spacing or cyclic prefix.

Figure 17:
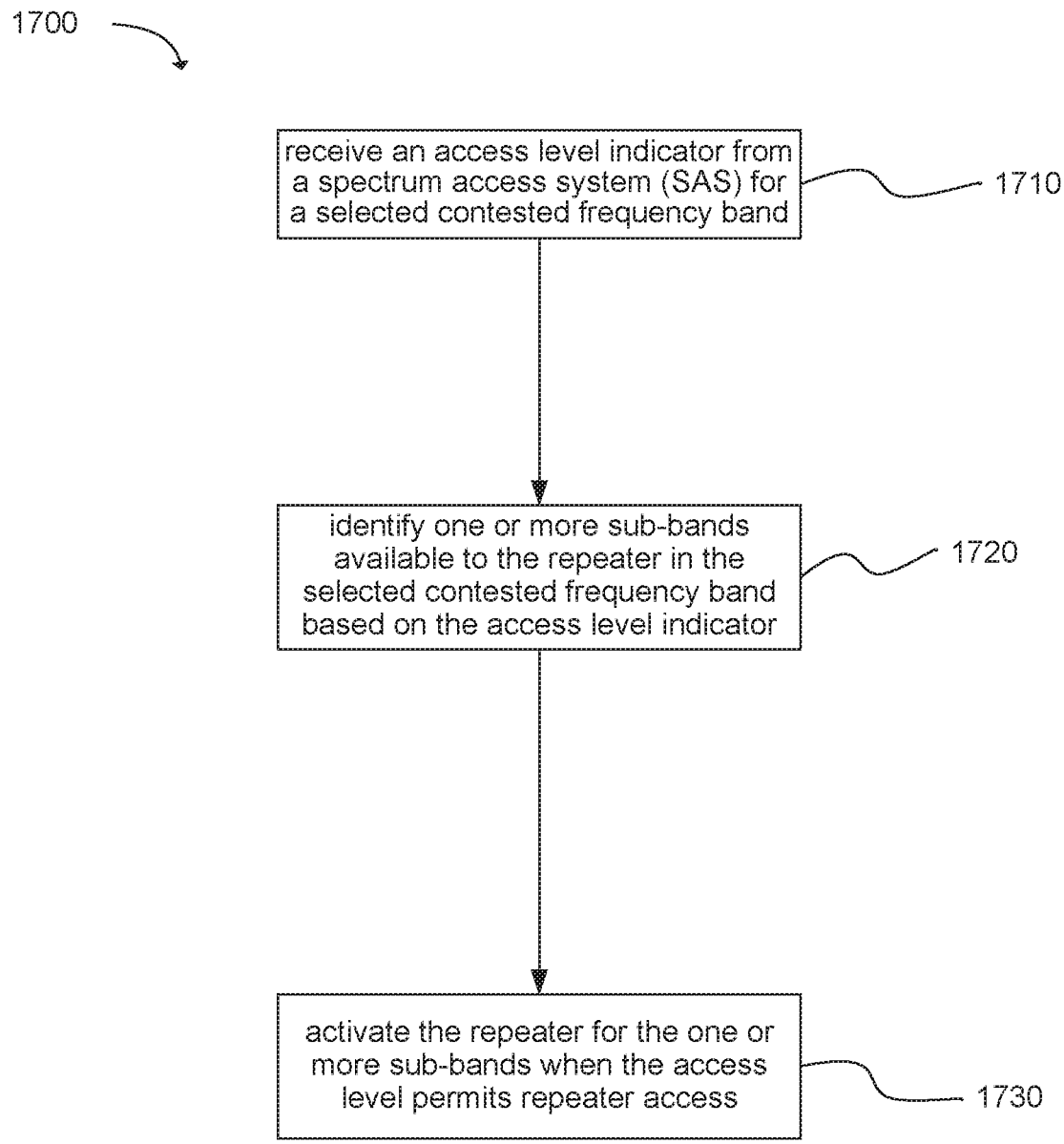
FIG. 17 depicts a repeater in accordance with an example.

Another example provides a repeater 1700, as shown in the flow chart in FIG. 17. The repeater can comprise one or more processors. The one or more processors can be configured to: receive an access level indicator from a spectrum access system (SAS) for a selected contested frequency band, as shown in block 1710. The one or more processors can be configured to: identify one or more sub-bands available to the repeater in the selected contested frequency band based on the access level indicator, as shown in block 1720. The one or more processors can be configured to: activate the repeater for the one or more sub-bands when the access level permits repeater access, as shown in block 1730.

Figure 18:
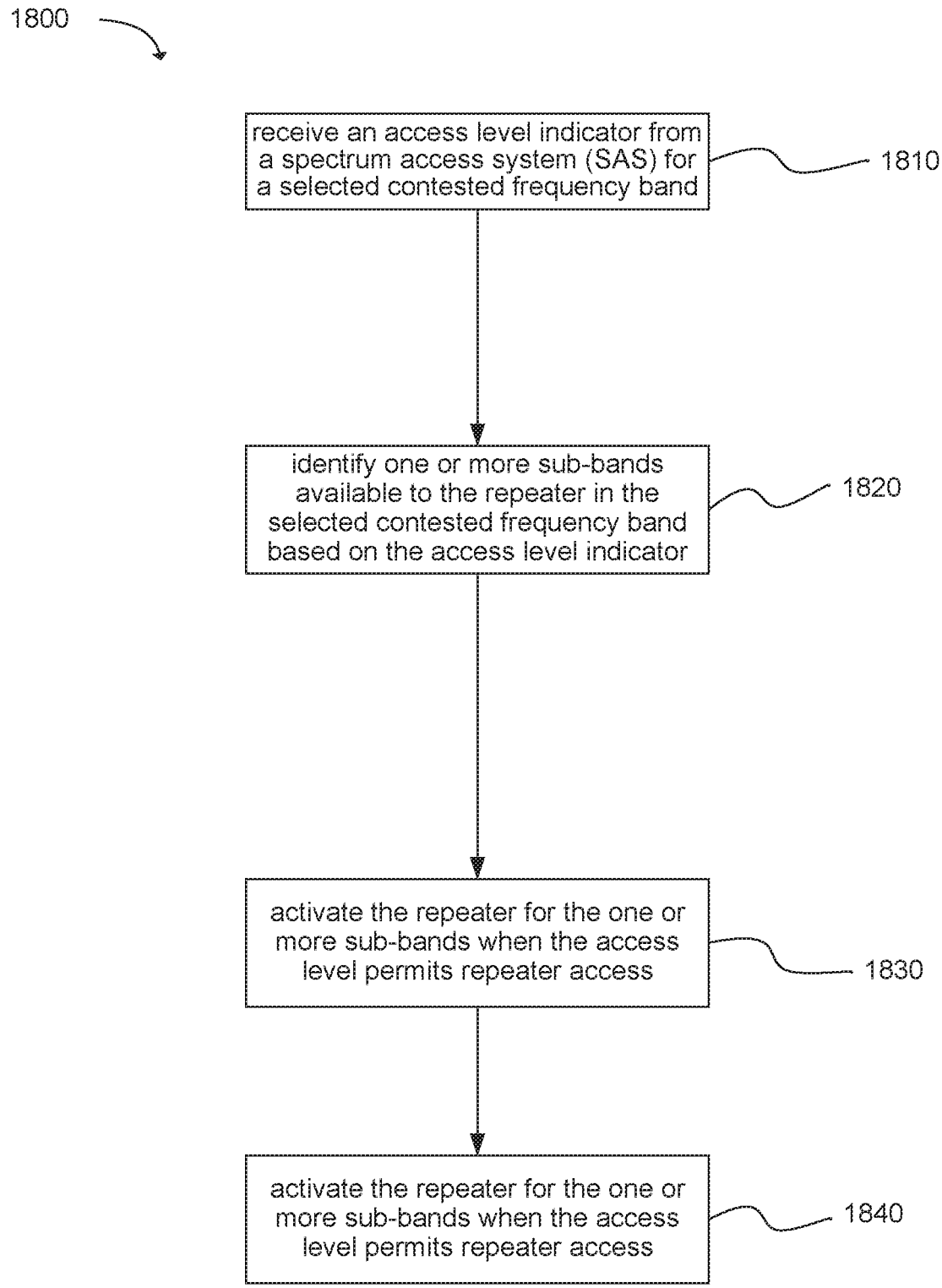
FIG. 18 depicts a repeater in accordance with an example.
Figure 19:
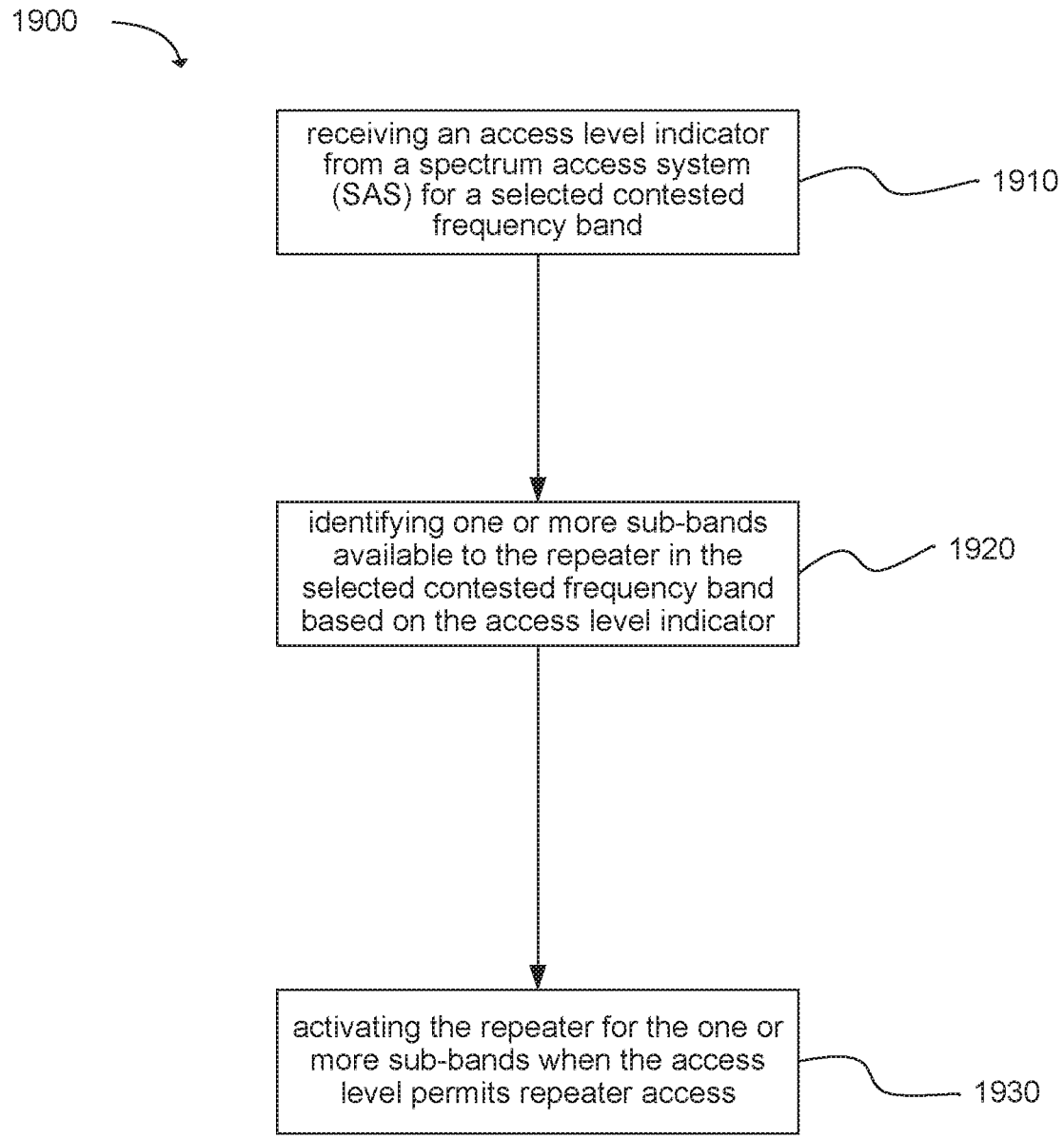
FIG. 19 depicts a flow chart of a machine readable medium having instructions embodied thereon for controlling a repeater in accordance with an example.

Another example provides a repeater 1800, as shown in the flow chart in FIG. 18. The repeater can comprise one or more processors. The one or more processors can be configured to: receive an access level indicator from a spectrum access system (SAS) for a selected contested frequency band, as shown in block 1810. The one or more processors can be configured to: identify one or more sub-bands available to the repeater in the selected contested frequency band based on the access level indicator, as shown in block 1820. The one or more processors can be configured to: activate the repeater for the one or more sub-bands when the access level permits repeater access, as shown in block 1830. The one or more processors can be configured to: adjust the peak-to-average power ratio (PAPR) of a transmitter output of the repeater to a permitted PAPR value based on a standard issued by a government or an industry-body, as shown in block 1840.

Another example provides at least one machine readable storage medium having instructions 1900 embodied thereon for controlling a repeater. The instructions can be executed on a machine, where the instructions are included on at least one computer readable medium or one non-transitory machine readable storage medium. The instructions when executed perform: receiving an access level indicator from a spectrum access system (SAS) for a selected contested frequency band, as shown in block 1910. The instructions when executed perform: identifying one or more sub-bands available to the repeater in the selected contested frequency band based on the access level indicator, as shown in block 1920. The instructions when executed perform: activating the repeater for the one or more sub-bands when the access level permits repeater access, as shown in block 1930.

Figure 20:
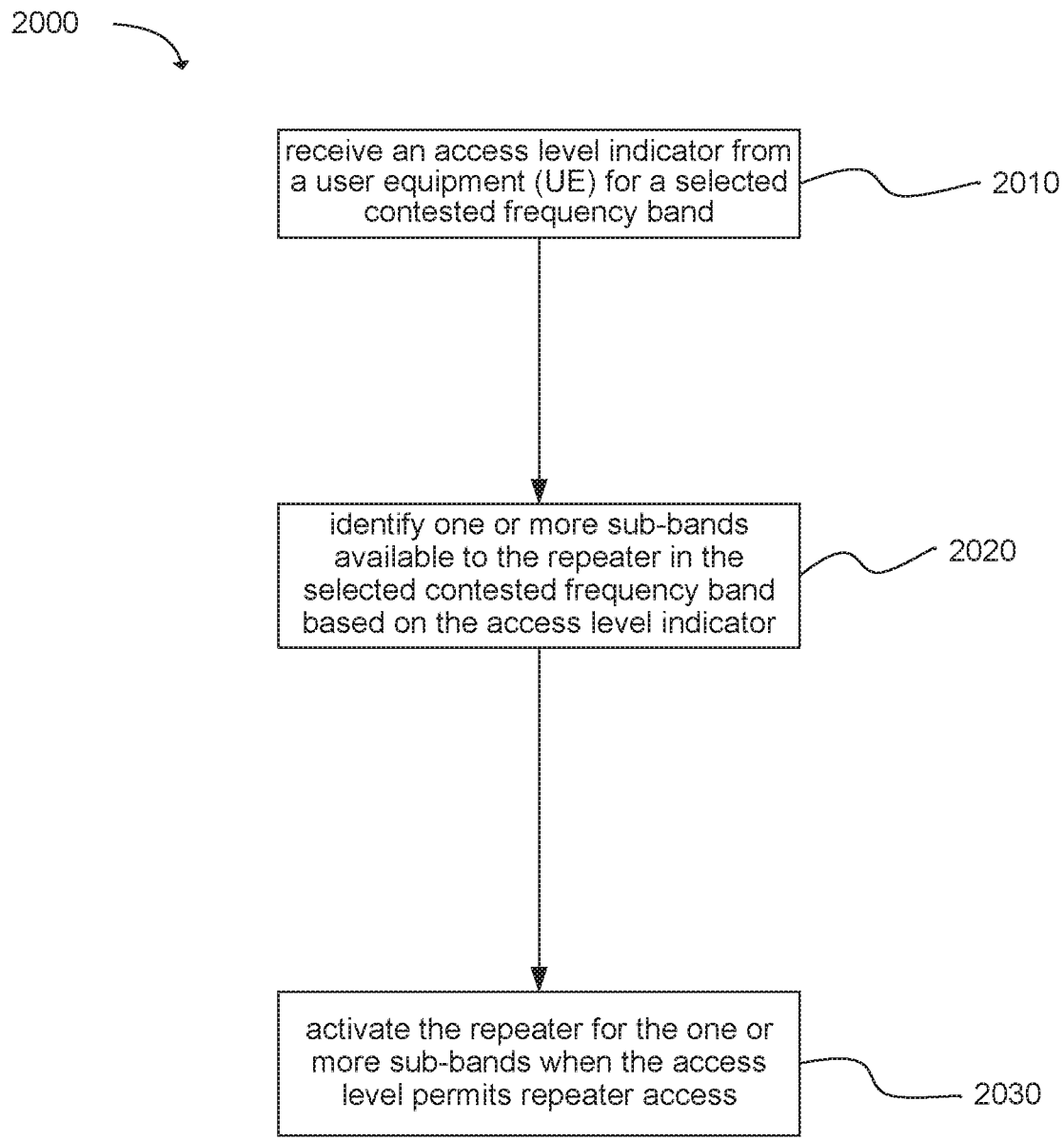
FIG. 20 depicts a repeater in accordance with an example.

Another example provides a repeater 2000, as shown in the flow chart in FIG. 20. The repeater can comprise one or more processors. The one or more processors can be configured to: receive an access level indicator from a user equipment (UE) for a selected contested frequency band, as shown in block 2010. The one or more processors can be configured to: identify one or more sub-bands available to the repeater in the selected contested frequency band based on the access level indicator, as shown in block 2020. The one or more processors can be configured to: activate the repeater for the one or more sub-bands when the access level permits repeater access, as shown in block 2030.

Examples

The following examples pertain to specific technology embodiments and point out specific features, elements, or actions that can be used or otherwise combined in achieving such embodiments.

Example 1 includes a repeater comprising: a first antenna port; a second antenna port; a frequency division duplex (FDD) first-direction amplification and filtering path coupled between the first antenna port and the second antenna port; an FDD second-direction amplification and filtering path coupled between the first antenna port and the second antenna port; a time division duplex (TDD) first-direction amplification and filtering path coupled between the first antenna port and the second antenna port; and a TDD second-direction amplification and filtering path coupled between the first antenna port and the second antenna port.

Example 2 includes the repeater of Example 1, further comprising: a first switch coupled between: the first antenna port; and the TDD first-direction amplification and filtering path and the TDD second-direction amplification and filtering path; and a second switch coupled between: the second antenna port; and the TDD first-direction amplification and filtering path and the TDD second-direction amplification and filtering path.

Example 3 includes the repeater of Example 2, further comprising a TDD switch controller, wherein the TDD switch controller is configured to: switch the first switch to pass a first-direction TDD signal from the first antenna port to the TDD first direction amplification and filtering path and switch the second switch to pass the first-direction TDD signal to the second antenna port; or switch the second switch to pass a second-direction TDD signal from the second antenna port to the TDD second direction amplification and filtering path and switch the first switch to pass the second-direction TDD signal to the first antenna port.

Example 4 includes the repeater of Example 2, further comprising a TDD switch controller, wherein the TDD switch controller is configured to: switch the first switch to pass a first-direction TDD signal from the first antenna port to the TDD first direction amplification and filtering path and switch the second switch to pass a second-direction TDD signal from the second antenna port to the TDD second direction amplification and filtering path; or switch the second switch to pass a second-direction TDD signal from the second antenna port to the TDD second direction amplification and filtering path and switch the first switch to pass the second-direction TDD signal to the first antenna port.

Example 5 includes the repeater of Example 3 or 4, wherein the TDD switch controller further comprises one or more of a modem, a field-programmable gate array (FPGA), or an application-specific integrated circuit (ASIC).

Example 6 includes the repeater of Example 2, further comprising: a first TDD band-pass filter (BPF) coupled between the first antenna port and the first switch; and a second TDD BPF coupled between the second antenna port and the second switch.

Example 7 includes the repeater of Example 6, wherein: the first TDD BPF is configured to communicate one or more of a third generation partnership project (3GPP) long term evolution (LTE) TDD frequency band 41, 48, or 49; and the second TDD BPF is configured to communicate one or more of a 3GPP LTE TDD frequency band 41, 48, or 49.

Example 8 includes the repeater of Example 6, wherein: the first TDD BPF is configured to communicate one or more of third generation partnership project (3GPP) long term evolution (LTE) TDD frequency bands 33 through 53, or 3GPP fifth generation (5G) TDD frequency bands n34, n38-n41, n48, n50-n51, n77-n79, n90, n257-n258, and n260-n261; and the second TDD BPF is configured to communicate one or more of 3GPP LTE TDD frequency bands 33 through 53, or 3GPP fifth generation (5G) TDD frequency bands n34, n38-n41, n48, n50-n51, n77-n79, n90, n257-n258, and n260-n261.

Example 9 includes the repeater of Example 1, further comprising: a first duplexer coupled between: the first antenna port; and the FDD first-direction amplification and filtering path and the FDD second-direction amplification and filtering path; and a second duplexer coupled between: the second antenna port; and the FDD first-direction amplification and filtering path and the FDD second-direction amplification and filtering path.

Example 10 includes the repeater of Example 1, further comprising: a first diplexer coupled between: the first antenna port; and the FDD first-direction amplification and filtering path, the FDD second-direction amplification and filtering path, the TDD first-direction amplification and filtering path, and the TDD second-direction amplification and filtering path; and a second diplexer coupled between: the second antenna port; and the FDD first-direction amplification and filtering path, the FDD second-direction amplification and filtering path, the TDD first-direction amplification and filtering path, and the TDD second-direction amplification and filtering path.

Example 11 includes the repeater of Example 1, further comprising: a first multiplexer coupled between: the first antenna port; and the FDD first-direction amplification and filtering path, the FDD second-direction amplification and filtering path, the TDD first-direction amplification and filtering path, and the TDD second-direction amplification and filtering path; and a second multiplexer coupled between: the second antenna port; and the FDD first-direction amplification and filtering path, the FDD second-direction amplification and filtering path, the TDD first-direction amplification and filtering path, and the TDD second-direction amplification and filtering path.

Example 12 includes the repeater of Example 11, wherein the first multiplexer is a triplexer comprising: a first connection coupled to the first antenna port; a second connection coupled to the FDD first-direction amplification and filtering path; a third connection coupled to the FDD second-direction amplification and filtering path; and a fourth connection coupled to the first switch.

Example 13 includes the repeater of Example 11, wherein the second multiplexer is a triplexer comprising: a first connection coupled to the second antenna port; a second connection coupled to the FDD first-direction amplification and filtering path; a third connection coupled to the FDD second-direction amplification and filtering path; and a fourth connection coupled to the second switch.

Example 14 includes the repeater of Example 1, further comprising: a first FDD band-pass filter (BPF) on the FDD first-direction amplification and filtering path; and a second FDD BPF on the FDD second-direction amplification and filtering path.

Example 15 includes the repeater of Example 14, wherein: the first FDD BPF is configured to communicate one or more of a third generation partnership project (3GPP) long term evolution (LTE) FDD frequency bands 2, 4, 5, 12, 13, 17, 25, 26, or 71; and the second FDD BPF is configured to communicate one or more of a 3GPP LTE FDD frequency bands 2, 4, 5, 12, 13, 17, 25, 26, or 71.

Example 16 includes the repeater of Example 14, wherein: the first FDD BPF is configured to communicate one or more of third generation partnership project (3GPP) long term evolution (LTE) FDD frequency bands 1-14, 17-28, 30-31, 65-66, 68, 70-74, 85, 87, or 88, or 3GPP fifth generation (5G) frequency bands n1-n3, n5, n7-n8, n12, n14, n18, n20, n25, n28, n30, n65-n66, n70-n71, or n74; and the second FDD BPF is configured to communicate one or more of 3GPP LTE FDD frequency bands 1-14, 17-28, 30-31, 65-66, 68, 70-74, 85, 87, or 88, or 3GPP fifth generation (5G) frequency bands n1-n3, n5, n7-n8, n12, n14, n18, n20, n25, n28, n30, n65-n66, n70-n71, or n74.

Example 17 includes the repeater of Example 1, wherein the first antenna port is configured to be coupled to a first antenna and the second antenna port is configured to be coupled to a second antenna.

Example 18 includes the repeater of Example 1, wherein each of the FDD first-direction amplification and filtering path, the FDD second-direction amplification and filtering path, the TDD first-direction amplification and filtering path, and the TDD second-direction amplification and filtering path further comprises one or more of: a low noise amplifier (LNA), a band-pass filter, a variable gain power amplifier, a fixed gain power amplifier, a gain block, or a variable attenuator.

Example 19 includes a repeater, wherein the repeater is configured to: receive an access level indicator from one or more of a base station or a user equipment (UE); identify an access level based on the access level indicator; and activate the repeater when the access level permits repeater access; or deactivate the repeater when the access level prohibits repeater access.

Example 20 includes the repeater of Example 19, further configured to: receive the access level indicator from the base station using one or more of a modem, a field-programmable gate array (FPGA), or an application-specific integrated circuit (ASIC).

Example 21 includes the repeater of Example 19, further configured to: receive the access level indicator from the UE using a modem, a field-programmable gate array (FPGA), or an application-specific integrated circuit (ASIC); or receive the access level indicator from the UE using a Bluetooth connection.

Example 22 includes the repeater of Example 19, further configured to: activate the repeater by one or more of: switch a first switch to pass a first-direction TDD signal from a first antenna port to a TDD first direction amplification and filtering path and switch a second switch to pass the first-direction TDD signal to a second antenna port; or switch a second switch to pass a second-direction TDD signal from a second antenna port to a TDD second direction amplification and filtering path and switch a first switch to pass the second-direction TDD signal to a first antenna port.

Example 23 includes the repeater of Example 19, further configured to: deactivate the repeater by one or more of: switch a first switch to pass a first-direction TDD signal from a first antenna port to a TDD first direction amplification and filtering path and switch a second switch to pass a second-direction TDD signal from a second antenna port to a TDD second direction amplification and filtering path; or switch a second switch to pass a second-direction TDD signal from a second antenna port to a TDD second direction amplification and filtering path and switch a first switch to pass the second-direction TDD signal to a first antenna port.

Example 24 includes at least one machine readable storage medium having instructions embodied thereon for controlling a repeater, the instructions when executed by one or more processors at the repeater perform the following: receiving an access level indicator from one or more of a base station or a user equipment (UE); identifying an access level based on the access level indicator; and activating the repeater when the access level permits repeater access; or deactivating the repeater when the access level prohibits repeater access.

Example 25 includes the at least one machine readable storage medium of Example 24, further comprising instructions that, when executed, perform the following: receiving the access level indicator from the base station using one or more of a modem, a field-programmable gate array (FPGA), or an application-specific integrated circuit (ASIC).

Example 26 includes the at least one machine readable storage medium of Example 24, further comprising instructions that, when executed, perform the following: receiving the access level indicator from the UE using a modem, a field-programmable gate array (FPGA), or an application-specific integrated circuit (ASIC); or receiving the access level indicator from the UE using a Bluetooth connection.

Example 27 includes the at least one machine readable storage medium of Example 24, further comprising instructions that, when executed, perform the following: activating the repeater by one or more of: switching a first switch to pass a first-direction TDD signal from a first antenna port to a TDD first direction amplification and filtering path and switch a second switch to pass the first-direction TDD signal to a second antenna port; or switching a second switch to pass a second-direction TDD signal from a second antenna port to a TDD second direction amplification and filtering path and switch a first switch to pass the second-direction TDD signal to a first antenna port.

Example 28 includes the at least one machine readable storage medium of Example 24, further comprising instructions that, when executed, perform the following: deactivating the repeater by one or more of: switching a first switch to pass a first-direction TDD signal from a first antenna port to a TDD first direction amplification and filtering path and switch a second switch to pass a second-direction TDD signal from a second antenna port to a TDD second direction amplification and filtering path; or switching a second switch to pass a second-direction TDD signal from a second antenna port to a TDD second direction amplification and filtering path and switch a first switch to pass the second-direction TDD signal to a first antenna port.

Example 29 includes a repeater comprising: one or more processors configured to: receive an access level indicator from a spectrum access system (SAS) for a selected contested frequency band; identify one or more sub-bands available to the repeater in the selected contested frequency band based on the access level indicator; and activate the repeater for the one or more sub-bands when the access level permits repeater access.

Example 30 includes the repeater of Example 29, wherein the one or more processors are further configured to: deactivate the repeater for one or more sub-bands that are prohibited based on the access level.

Example 31 includes the repeater of Example 29, wherein the one or more processors are further configured to: select the one or more sub-bands using a tunable filter, wherein the tunable filter includes one or more digital filters; or select the one or more sub-bands using a switchable filter, wherein the switchable filter includes one or more analog filters.

Example 32 includes the repeater of Example 29, wherein the one or more sub-bands are selected from a subset of one or more of: third generation partnership project (3GPP) long term evolution (LTE) TDD frequency band 41, 48, or 49; or 3GPP LTE TDD frequency bands 33 through 53, or 3GPP fifth generation (5G) TDD frequency bands n34, n38-n41, n48, n50-n51, n77-n79, n90, n257-n258, and n260-n261; or 3GPP LTE FDD frequency bands 2, 4, 5, 12, 13, 17, 25, 26, or 71; or 3GPP LTE FDD frequency bands 1-14, 17-28, 30-31, 65-66, 68, 70-74, 85, 87, or 88, or 3GPP 5G frequency bands n1-n3, n5, n7-n8, n12, n14, n18, n20, n25, n28, n30, n65-n66, n70-n71, or n74.

Example 33 includes the repeater of Example 31, wherein the one or more processors are further configured to: dynamically select the one or more sub-bands using the tunable filter, wherein the tunable filter is a channelized intermediate frequency (IF) or radio frequency (RF) filter.

Example 34 includes the repeater of Example 29, wherein the one or more processors are further configured to: communicate with the SAS via one or more of a wired connection or a wireless connection.

Example 35 includes the repeater of Example 29, wherein the one or more processors are further configured to: limit the peak-to-average power ratio (PAPR) of a transmitter output of the repeater to a permitted PAPR value based on a standard issued by a government or an industry-body.

Example 36 includes the repeater of Example 35, wherein the standard is 47 Code of Federal Regulations (CFR) section 96.41(g).

Example 37 includes the repeater of Example 35, wherein the one or more processors are further configured to: limit the PAPR using one or more of: hard clamping; or crest factor reduction (CFR).

Example 38 includes the repeater of Example 29, wherein the one or more processors are further configured to: limit the peak-to-average power ratio (PAPR) of the transmitter output of the repeater to less than a value of 13 decibels (dB).

Example 39 includes the repeater of Example 29, wherein the repeater is further configured to: transmit at a low-power-level over one or more sub-bands that are prohibited based on the access level indicator; or switch from the low-power-level to a high-power-level when the one or more prohibited sub-bands become available.

Example 40 includes the repeater of Example 29, wherein the access level indicator is received at the repeater from the SAS via one or more of a cloud-computing environment, a user equipment (UE), a base station (BS), or a modem.

Example 41 includes a repeater comprising: one or more processors configured to: receive an access level indicator from a spectrum access system (SAS) for a selected contested frequency band; identify one or more sub-bands available to the repeater in the selected contested frequency band based on the access level indicator; activate the repeater for the one or more sub-bands when the access level permits repeater access; and limit the peak-to-average power ratio (PAPR) of a transmitter output of the repeater to less than a permitted PAPR value based on a standard issued by a government or an industry-body.

Example 42 includes the repeater of Example 41, wherein the standard is 47 Code of Federal Regulations (CFR) section 96.41(g).

Example 43 includes the repeater of Example 41, wherein the one or more processors are further configured to: limit the PAPR using one or more of: hard clamping; or crest factor reduction (CFR).

Example 44 includes the repeater of Example 41, wherein the one or more processors are further configured to: limit the PAPR of the transmitter output of the repeater to a value of 13 decibels (dB).

Example 45 includes the repeater of Example 41, wherein the access level indicator is received at the repeater from the SAS via one or more of a cloud-computing environment, a user equipment (UE), a base station (BS), or a modem.

Example 46 includes a repeater comprising: one or more processors configured to: receive an access level indicator from a user equipment (UE) for a selected contested frequency band; identify one or more sub-bands available to the repeater in the selected contested frequency band based on the access level indicator; and activate the repeater for the one or more sub-bands when the access level permits repeater access.

Example 47 includes the repeater of Example 46, wherein the one or more processors are further configured to: deactivate the repeater for one or more sub-bands that are prohibited based on the access level.

Example 48 includes the repeater of Example 46, wherein the one or more processors are further configured to: select the one or more sub-bands using a tunable filter, wherein the tunable filter includes one or more digital filters; or select the one or more sub-bands using a switchable filter, wherein the switchable filter includes one or more analog filters.

Example 49 includes the repeater of Example 46, wherein the one or more sub-bands are selected from a subset of one or more of: third generation partnership project (3GPP) long term evolution (LTE) TDD frequency band 41, 48, or 49; or 3GPP LTE TDD frequency bands 33 through 53, or 3GPP fifth generation (5G) TDD frequency bands n34, n38-n41, n48, n50-n51, n77-n79, n90, n257-n258, and n260-n261; or 3GPP LTE FDD frequency bands 2, 4, 5, 12, 13, 17, 25, 26, or 71; or 3GPP LTE FDD frequency bands 1-14, 17-28, 30-31, 65-66, 68, 70-74, 85, 87, or 88, or 3GPP 5G frequency bands n1-n3, n5, n7-n8, n12, n14, n18, n20, n25, n28, n30, n65-n66, n70-n71, or n74.

Example 50 includes the repeater of Example 48, wherein the one or more processors are further configured to: dynamically select the one or more sub-bands using the tunable filter, wherein the tunable filter is a channelized intermediate frequency (IF) or radio frequency (RF) filter.

Example 51 includes the repeater of Example 46, wherein the one or more processors are further configured to: limit the peak-to-average power ratio (PAPR) of a transmitter output of the repeater to less than a permitted PAPR value based on a standard issued by a government or an industry-body.

Example 52 includes the repeater of Example 51, wherein the standard is 47 Code of Federal Regulations (CFR) section 96.41(g).

Example 53 includes the repeater of Example 51, wherein the one or more processors are further configured to: limit the PAPR using one or more of: hard clamping; or crest factor reduction (CFR).

Example 54 includes the repeater of Example 46, wherein the one or more processors are further configured to: limit the peak-to-average power ratio (PAPR) of the transmitter output of the repeater to less than a value of 13 decibels (dB).

Example 55 includes the repeater of Example 46, wherein the repeater is further configured to: transmit at a low-power-level over one or more sub-bands that are prohibited based on the access level indicator; or switch from the low-power-level to a high-power-level when the one or more prohibited sub-bands become available.

Example 56 includes the repeater of Example 46, wherein the access level indicator is received at the repeater from the SAS via the UE.

Example 57 includes a repeater comprising: one or more processors configured to: receive an access level indicator from a spectrum access system (SAS) for a selected contested frequency band; identify one or more sub-bands available to the repeater in the selected contested frequency band based on the access level indicator; and activate the repeater for the one or more sub-bands when the access level permits repeater access.

Example 58 includes the repeater of Example 57, wherein the one or more processors are further configured to: deactivate the repeater for one or more sub-bands that are prohibited based on the access level.

Example 59 includes the repeater of Example 57, wherein the one or more processors are further configured to: select the one or more sub-bands using a tunable filter, wherein the tunable filter includes one or more digital filters; or select the one or more sub-bands using a switchable filter, wherein the switchable filter includes one or more analog filters.

Example 60 includes the repeater of Example 57, wherein the one or more sub-bands are selected from a subset of one or more of: third generation partnership project (3GPP) long term evolution (LTE) TDD frequency band 41, 48, or 49; or 3GPP LTE TDD frequency bands 33 through 53, or 3GPP fifth generation (5G) TDD frequency bands n34, n38-n41, n48, n50-n51, n77-n79, n90, n257-n258, and n260-n261; or 3GPP LTE FDD frequency bands 2, 4, 5, 12, 13, 17, 25, 26, or 71; or 3GPP LTE FDD frequency bands 1-14, 17-28, 30-31, 65-66, 68, 70-74, 85, 87, or 88, or 3GPP 5G frequency bands n1-n3, n5, n7-n8, n12, n14, n18, n20, n25, n28, n30, n65-n66, n70-n71, or n74.

Example 61 includes the repeater of Example 59, wherein the one or more processors are further configured to: dynamically select the one or more sub-bands using the tunable filter, wherein the tunable filter is a channelized intermediate frequency (IF) or radio frequency (RF) filter.

Example 62 includes the repeater of Example 57, wherein the one or more processors are further configured to: communicate with the SAS via one or more of a wired connection or a wireless connection; or limit the peak-to-average power ratio (PAPR) of a transmitter output of the repeater to a permitted PAPR value based on a standard issued by a government or an industry-body; or limit the peak-to-average power ratio (PAPR) of a transmitter output of the repeater using one or more of: hard clamping; or crest factor reduction (CFR).

Example 63 includes the repeater of Example 57, wherein the one or more processors are further configured to: limit the peak-to-average power ratio (PAPR) of the transmitter output of the repeater to less than a value of 13 decibels (dB); or transmit at a low-power-level over one or more sub-bands that are prohibited based on the access level indicator; or switch from the low-power-level to a high-power-level when the one or more prohibited sub-bands become available.

Example 64 includes the repeater of Example 57, wherein the access level indicator is received at the repeater from the SAS via one or more of a cloud-computing environment, a user equipment (UE), a base station (BS), or a modem.

Example 65 includes a repeater system comprising: a repeater comprising: one or more processors configured to: receive an access level indicator from a user equipment (UE) for a selected contested frequency band; identify one or more sub-bands available to the repeater in the selected contested frequency band based on the access level indicator; and activate the repeater for the one or more sub-bands when the access level permits repeater access.

Example 66 includes the repeater system of Example 65, wherein the one or more processors are further configured to: deactivate the repeater for one or more sub-bands that are prohibited based on the access level.

Example 67 includes the repeater system of Example 65, wherein the one or more processors are further configured to: select the one or more sub-bands using a tunable filter, wherein the tunable filter includes one or more digital filters; or select the one or more sub-bands using a switchable filter, wherein the switchable filter includes one or more analog filters.

Example 68 includes the repeater system of Example 65, wherein the one or more sub-bands are selected from a subset of one or more of: third generation partnership project (3GPP) long term evolution (LTE) TDD frequency band 41, 48, or 49; or 3GPP LTE TDD frequency bands 33 through 53, or 3GPP fifth generation (5G) TDD frequency bands n34, n38-n41, n48, n50-n51, n77-n79, n90, n257-n258, and n260-n261; or 3GPP LTE FDD frequency bands 2, 4, 5, 12, 13, 17, 25, 26, or 71; or 3GPP LTE FDD frequency bands 1-14, 17-28, 30-31, 65-66, 68, 70-74, 85, 87, or 88, or 3GPP 5G frequency bands n1-n3, n5, n7-n8, n12, n14, n18, n20, n25, n28, n30, n65-n66, n70-n71, or n74.

Example 69 includes the repeater system of Example 67, wherein the one or more processors are further configured to: dynamically select the one or more sub-bands using the tunable filter, wherein the tunable filter is a channelized intermediate frequency (IF) or radio frequency (RF) filter.

Example 70 includes the repeater system of Example 65, wherein the one or more processors are further configured to: limit the peak-to-average power ratio (PAPR) of a transmitter output of the repeater to less than a permitted PAPR value based on a standard issued by a government or an industry-body; or limit the peak-to-average power ratio (PAPR) of a transmitter output of the repeater using one or more of: hard clamping; or crest factor reduction (CFR).

Example 71 includes the repeater system of Example 65, wherein the one or more processors are further configured to: limit the peak-to-average power ratio (PAPR) of the transmitter output of the repeater to less than a value of 13 decibels (dB); or transmit at a low-power-level over one or more sub-bands that are prohibited based on the access level indicator; or switch from the low-power-level to a high-power-level when the one or more prohibited sub-bands become available.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The low energy fixed location node, wireless device, and location server can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A repeater configured to operate on a frequency band that is contested with the operation of a higher priority level device, the repeater comprising:
   one or more processors configured to:
      receive an access level indicator from a spectrum access system (SAS) configured to authorize use of a shared spectrum for a selected contested frequency band in the shared spectrum;
      identify one or more sub-bands available to the repeater in the selected contested frequency band based on the access level indicator from the SAS; and
      activate the repeater for each of the one or more available sub-bands when the access level indicator from the SAS permits repeater access.

2. The repeater of claim 1, wherein the one or more processors are further configured to:
   deactivate the repeater for one or more sub-bands that are prohibited based on the access level indicator.

3. The repeater of claim 1, wherein the one or more processors are further configured to:
   select the one or more sub-bands using a tunable filter, wherein the tunable filter includes one or more digital filters; or
   select the one or more sub-bands using a switchable filter, wherein the switchable filter includes one or more analog filters.

4. The repeater of claim 3, wherein the one or more processors are further configured to:
   dynamically select the one or more sub-bands using the tunable filter, wherein the tunable filter is a channelized intermediate frequency (IF) or radio frequency (RF) filter.

5. The repeater of claim 1, wherein the one or more sub-bands are selected from a subset of one or more of:
   third generation partnership project (3GPP) long term evolution (LTE) TDD frequency band 41, 48, or 49; or
   3GPP LTE TDD frequency bands 33 through 53, or 3GPP fifth generation (5G) TDD frequency bands n34, n38-n41, n48, n50-n51, n77-n79, n90, n257-n258, and n260-n261; or
   3GPP LTE FDD frequency bands 2, 4, 5, 12, 13, 17, 25, 26, or 71; or
   3GPP LTE FDD frequency bands 1-14, 17-28, 30-31, 65-66, 68, 70-74, 85, 87, or 88, or 3GPP 5G frequency bands n1-n3, n5, n7-n8, n12, n14, n18, n20, n25, n28, n30, n65-n66, n70-n71, or n74.

6. The repeater of claim 1, wherein the one or more processors are further configured to:
   communicate with the SAS via one or more of a wired connection or a wireless connection.

7. The repeater of claim 1, wherein the one or more processors are further configured to:
   limit the peak-to-average power ratio (PAPR) of a transmitter output of the repeater to a permitted PAPR value based on a standard issued by a government or an industry-body.

8. The repeater of claim 7, wherein the standard is 47 Code of Federal Regulations (CFR) section 96.41(g).

9. The repeater of claim 7, wherein the one or more processors are further configured to:
    limit the PAPR using one or more of:
        hard clamping; or
        crest factor reduction (CFR).

10. The repeater of claim 1, wherein the one or more processors are further configured to:
    limit the peak-to-average power ratio (PAPR) of the transmitter output of the repeater to less than a value of 13 decibels (dB).

11. The repeater of claim 1, wherein the one or more processors are further configured to:
    transmit at a low-power-level over one or more sub-bands that are prohibited based on the access level indicator; or
    switch from the low-power-level to a high-power-level when the one or more prohibited sub-bands become available.

12. The repeater of claim 1, wherein the access level indicator is received at the repeater from the SAS via one or more of a cloud-computing environment, a user equipment (UE), a base station (BS), or a modem.

13. A repeater configured to operate on a frequency band that is contested with the operation of a higher priority level device, the repeater comprising:
    one or more processors configured to:
        receive an access level indicator from a spectrum access system (SAS) configured to authorize use of a shared spectrum for a selected contested frequency band in the shared spectrum;
        identify one or more sub-bands available to the repeater in the selected contested frequency band based on the access level indicator;
        activate the repeater for each of the one or more available sub-bands when the access level indicator from the SAS permits repeater access; and
        limit the peak-to-average power ratio (PAPR) of a transmitter output of the repeater to less than a permitted PAPR value based on a standard issued by a government or an industry-body.

14. The repeater of claim 13, wherein the standard is 47 Code of Federal Regulations (CFR) section 96.41(g).

15. The repeater of claim 13, wherein the one or more processors are further configured to:
    limit the PAPR using one or more of:
        hard clamping; or
        crest factor reduction (CFR).

16. The repeater of claim 13, wherein the one or more processors are further configured to:
    limit the PAPR of the transmitter output of the repeater to a value of 13 decibels (dB).

17. The repeater of claim 13, wherein the access level indicator is received at the repeater from the SAS via one or more of a cloud-computing environment, a user equipment (UE), a base station (BS), or a modem.

18. A repeater configured to operate on a frequency band that is contested with the operation of a higher priority level device, the repeater comprising:
    one or more processors configured to:
        receive an access level indicator from a user equipment (UE) for a selected contested frequency band, wherein the access level indicator is from a spectrum access system (SAS) configured to authorize the use of the selected contested frequency band;
        identify one or more sub-bands available to the repeater in the selected contested frequency band based on the access level indicator from the SAS; and
        activate the repeater for each of the one or more sub-bands when the access level indicator from the SAS permits repeater access.

19. The repeater of claim 18, wherein the one or more processors are further configured to:
    deactivate the repeater for one or more sub-bands that are prohibited based on the access level.

20. The repeater of claim 18, wherein the one or more processors are further configured to:
    select the one or more sub-bands using a tunable filter, wherein the tunable filter includes one or more digital filters; or
    select the one or more sub-bands using a switchable filter, wherein the switchable filter includes one or more analog filters.

21. The repeater of claim 20, wherein the one or more processors are further configured to:
    dynamically select the one or more sub-bands using the tunable filter, wherein the tunable filter is a channelized intermediate frequency (IF) or radio frequency (RF) filter.

22. The repeater of claim 18, wherein the one or more sub-bands are selected from a subset of one or more of:
    third generation partnership project (3GPP) long term evolution (LTE) TDD frequency band 41, 48, or 49; or
    3GPP LTE TDD frequency bands 33 through 53, or 3GPP fifth generation (5G) TDD frequency bands n34, n38-n41, n48, n50-n51, n77-n79, n90, n257-n258, and n260-n261; or
    3GPP LTE FDD frequency bands 2, 4, 5, 12, 13, 17, 25, 26, or 71; or
    3GPP LTE FDD frequency bands 1-14, 17-28, 30-31, 65-66, 68, 70-74, 85, 87, or 88, or 3GPP 5G frequency bands n1-n3, n5, n7-n8, n12, n14, n18, n20, n25, n28, n30, n65-n66, n70-n71, or n74.

23. The repeater of claim 18, wherein the one or more processors are further configured to:
    limit the peak-to-average power ratio (PAPR) of a transmitter output of the repeater to less than a permitted PAPR value based on a standard issued by a government or an industry-body.

24. The repeater of claim 23, wherein the standard is 47 Code of Federal Regulations (CFR) section 96.41(g).

25. The repeater of claim 23, wherein the one or more processors are further configured to:
    limit the PAPR using one or more of:
        hard clamping; or
        crest factor reduction (CFR).

26. The repeater of claim 18, wherein the one or more processors are further configured to:
    limit the peak-to-average power ratio (PAPR) of the transmitter output of the repeater to less than a value of 13 decibels (dB).

27. The repeater of claim 18, wherein the one or more processors are further configured to:
    transmit at a low-power-level over one or more sub-bands that are prohibited based on the access level indicator; or
    switch from the low-power-level to a high-power-level when the one or more prohibited sub-bands become available.

28. The repeater of claim 18, wherein the access level indicator is received at the repeater from the SAS via the UE.

* * * * *